US006404933B1

(12) United States Patent
Yamamoto

(10) Patent No.: US 6,404,933 B1
(45) Date of Patent: Jun. 11, 2002

(54) IMAGE ENCODING METHOD AND APPARATUS THEREOF

(75) Inventor: Naoto Yamamoto, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/088,968

(22) Filed: Jun. 2, 1998

(30) Foreign Application Priority Data

Jun. 2, 1997 (JP) .............................................. 9-142850

(51) Int. Cl.$^7$ ................................................ G06K 9/46
(52) U.S. Cl. ...................................... 382/251; 382/246
(58) Field of Search ................................. 382/232–253; 348/400–417, 427, 433, 390, 397–398, 586; 375/240

(56) References Cited

U.S. PATENT DOCUMENTS

| | | | | |
|---|---|---|---|---|
| 4,837,618 A | * | 6/1989 | Hatori et al. | 358/135 |
| 4,920,426 A | * | 4/1990 | Hatori et al. | 358/433 |
| 5,335,016 A | * | 8/1994 | Nakagawa | 348/405 |
| 5,510,839 A | * | 4/1996 | Hamano et al. | 348/402 |
| 5,568,278 A | * | 10/1996 | Nakano et al. | 358/427 |
| 5,627,590 A | * | 5/1997 | Hamano et al. | 348/402 |
| 5,844,628 A | * | 12/1998 | Hamano et al. | 348/616 |

FOREIGN PATENT DOCUMENTS

| | | |
|---|---|---|
| JP | 4-2291 | 1/1992 |
| JP | 4-18857 | 1/1992 |
| JP | 4-167868 | 6/1992 |
| JP | 6-350985 | 12/1994 |
| JP | 6-350991 | 12/1994 |
| JP | 7-115645 | 5/1995 |
| JP | 7-131793 | 5/1995 |
| JP | 7-274172 | 10/1995 |
| JP | 8-18960 | 1/1996 |

OTHER PUBLICATIONS

Japanese Office Action issued Jul. 27, 1997 in a related application.
English translation of relevant portions of Jul. 27,1997 Japanese Office Action.

* cited by examiner

Primary Examiner—Phuoc Tran
Assistant Examiner—Amir Alavi
(74) Attorney, Agent, or Firm—Dickstein, Shapiro, Morin & Oshinsky, LLP.

(57) ABSTRACT

An image encoding apparatus according to the present invention effectively encodes an image without its degradation, at a low price. A block division circuit 1 receives image data 100, dividing it into several blocks. An orthogonal transformation circuit 2 orthogonally transforms each block of divided image data into transformed coefficients. A code amount control circuit 3 calculates a quantization step value 105 and a quantization number 106, which will restrict the number of coefficients in a macroblock to be quantized, using both the sum of the absolute values of the transformed coefficients of respective blocks and a code amount cumulative value 104 output from a variable-length encoding circuit 6, and then outputs them to a quantization circuit 5. A delay circuit 4 delays the coefficients 102 for the necessary number of clock pulses. The quantization circuit 5 quantizes the delayed coefficients 107, using the quantization step value 105 and the quantization number 106. The variable-length encoding circuit 6 encodes the quantized transformed coefficients, and then outputs them as encoded data 109. It also outputs a cumulative code amount 104 for a frame to the code amount control circuit 3.

3 Claims, 19 Drawing Sheets

MAIN PROGRAM ROUTINE (1/2)

IMAGE ENCODING METHOD AND APPARATUS THEREOF

BACKGROUND OF THE INVENTION

The present invention relates to an image encoding method and apparatus thereof. Specifically with relation to an image encoding apparatus comprising of a code amount control circuit which makes both an orthogonal transformation and a variable-length encoding of the entered image signals.

In general, the conventional image encoding apparatus utilizes an orthogonal transformation and variable-length encoding process. The image encoding apparatus makes an orthogonal transformation of the entered image signals, causing a polarization of the transformed coefficients. It then assigns short code words to the transformed coefficients with high occurrence probabilities, and long code words to those with low occurrence probabilities, compressing the entire code amount. This enables high efficient encoding. The image encoding apparatus needs a code amount control circuit to encode the entered image with different information contents and different characteristics, using a given amount of codes.

Code amount control circuits utilizing conventional technologies need to control the code amount within a given time, when it encodes dynamic images in real time. Thus, it makes use of a method with the combination of a feedforward and feedback control approaches.

It is well-known that with the feedforward control approach through both quantizing and variable-length encoding DCT coefficients in advance, control of the code amount can be most accurately made to analyze the characteristics of both the entered images and the variable-length code words to be utilized for encoding. However, it is difficult, to develop small-sized apparatus due to the large scale circuits to a variable-length encode. Thus, the control is made utilizing a correlation of neighboring pixels in the entered image and/or the sum of the absolute values of the DCT coefficients, realizing smaller-sized circuits with lower predictive accuracy. Such control with the sum of the absolute values of DCT coefficients accords the variable-length encoding operation in which a short code word will be assigned to a low transformed coefficient with a high occurrence frequency, while a long code word will be assigned to a high transformed coefficient with a low occurrence frequency.

With the feedback control approach, a quantization step value is decreased for the image encoded with less than a given code amount reference so as also to decrease corresponding quantization step size, allowing for reducing the number of quantization coefficients to be discarded. Conversely, the quantization step value is increased for the image encoded with not less than the code amount reference so as also to increase the quantization step size, allowing to increase the number of quantization coefficients to be discarded.

However, with the aforementioned conventional feedforward approach, prediction of the referential quantization step value, which will be used to encode the entered image in a vicinity of the code amount reference, is hard to be made. Moreover, the occurrence of a local image quality degrading may be easily recognized when the image is processed with several quantization step values; thus it is necessary to take into consideration the characteristics of the image. This kind of problem occurs due to the fact that the relation between the sum of the absolute values of DCT coefficients and the generated code amount is not linear. The relation also largely depends on the characteristics of the image.

As described earlier, the image encoding apparatus, which controls the entire code amount, in accordance with both the sum of the absolute values of DCT coefficients calculated with a conventional approach, and a cumulative code amount output from the variable-length encoding unit, has difficulty in making a prediction of the referential quantization step value in the vicinity of a code amount reference. In addition, the occurrence of degrading image quality may be seen as a defect in the beginning period of the image encoding process. Particularly, for an entered image with different characteristics, a partial degradation of the image quality may be easily be recognized in a level image block but a complex image block, when quantization operation is performed with a same quantization step value for both the level and complex image blocks. This may cause for missing information in the low frequency bands of transformed coefficients, this can be attributed to the fact that the human eye is not good at visually recognizing a degrading image easily within complex image portions, while good at doing so within level image portions.

SUMMARY OF THE INVENTION

Accordingly, the objective of the present invention is to provide an image encoding method and apparatus thereof which will effectively encode an image at a low price. Particularly, a prospective greatly compressed (encoded) image region where degrading image quality may be easily recognized, into an encoded image in not more than a given code amount reference, and also generating a reproduced image of high quality.

According to an aspect of the present invention, the foregoing objectives are attained by generating a quantization step value for the spatial frequency-domain coefficients in each macroblock in an image frame, dependent upon at least a code amount reference, a macroblock absolute values sum, and a frame absolute values sum; quantizing the spatial frequency-domain coefficients for a macroblock in accordance with at least the quantization step value; and variable-length encoding the quantized spatial frequency-domain coefficients into encoded data. An example processing structure to realize the previous operation will be shown as a feedforward control system in FIGS. 1 and 2.

According to another aspect of the present invention, the foregoing objectives are attained by generating a quantization step value for the spacial frequency-domain coefficients in each macroblock in an image frame, dependent upon at least a code amount reference, a slice absolute values sum, and a frame absolute values sum; quantizing the spatial frequency-domain coefficients for a macroblock in accordance with at least the quantization step value; and variable-length encoding the quantized spacial frequency-domain coefficients into encoded data. An example processing structure to realize the previous operation will be shown as a feedforward control system in FIGS. 1 and 7.

According to yet another aspect of the present invention, the foregoing objectives are attained by generating a quantization step value for the spatial frequency-domain coefficients in each macroblock in an image frame, dependent upon at least a code amount reference, a macroblock absolute values sum, a slice absolute values sum, and a frame absolute values sum; quantizing the spatial frequency-domain coefficients for a macroblock in accordance with at least the quantization step value; and variable-length encoding the quantized spacial frequency-domain coefficients into encoded data. An example processing structure to realize the previous operation will be shown as a feedforward control system in FIGS. 1 and 8.

According to yet another aspect of the present invention, the foregoing objectives are attained by generating a quantization step value for the spatial frequency-domain coefficients in each macroblock in an image frame, dependent upon at least a code amount reference, a macroblock absolute values sum, a frame absolute values sum, and the latest code amount; quantizing the spatial frequency-domain coefficients for a macroblock in accordance with at least the quantization step value; and variable-length encoding the quantized spacial frequency-domain coefficients into encoded data, and accumulates an amount of the encoded data into the latest code amount. An example processing structure to realize the previous operation will be shown as a feedforward and feedback control systems in FIGS. 1 and 2.

According to yet another aspect of the present invention, the foregoing objectives are attained by generating a quantization step value for the spatial frequency-domain coefficients in each macroblock in an image frame, dependent upon at least a code amount reference, a slice absolute values sum, a frame absolute values sum, and the latest code amount output from a variable-length encoding means; quantizing the spatial frequency-domain coefficients for a macroblock in accordance with at least the quantization step value; and variable-length encoding the quantized spacial frequency-domain coefficients into encoded data, and accumulates an amount of the encoded data into the latest code amount. An example processing structure to realize the previous operation will be shown as a feedforward and feedback control systems in FIGS. 1 and 7.

According to yet another aspect of the present invention, the foregoing objectives are attained by generating a quantization step value for the spatial frequency-domain in each macroblock in an image frame, dependent upon at least a code amount reference, a macroblock absolute values sum, a slice absolute values sum, a frame absolute values sum, and the latest code amount; quantizing the spatial frequency-domain coefficients for a macroblock in accordance with at least the quantization step value; and variable-length encoding the quantized spacial frequency-domain coefficients into encoded data, and accumulates an amount of the encoded data into the latest code amount. An example processing structure to realize the previous operation will be shown as a feedforward and feedback control systems in FIGS. 1 and 8.

According to yet another aspect of the present invention, the foregoing objectives are attained by: block partitioning means (1) for partitioning entered image signals (100) into small blocks, each made up of a plurality of pixels; orthogonal transformation means (2) for making an orthogonal transformation of each of the small blocks; quantization means (5) for quantizing orthogonally transformed coefficients (102); code amount control means for calculating a quantization step value (105) for each macroblock made up of a plurality of blocks, which will be used by the quantization means (5); variable-length encoding means (6) for variable-length encoding the quantized, transformed coefficients (108), utilizing the run-length coding method or the Huffman coding method; and then outputting them as encoded data (109) corresponding to the image signals (100). An example processing structure to realize the previous operation will be shown as a feedforward and feedback control systems in FIG. 1.

BRIEF DESCRIPTION OF DRAWINGS

Other features and advantages of the invention will be made more apparent by the detailed description hereunder, taken in conjunction with the accompanying drawings, wherein.

DETAILED DESCRIPTION OF THE PREFERRED EMBODIMENTS

An image encoding apparatus of a first embodiment according to the present invention will be described in detail with reference to Figs. FIGS. 1 to 9 shows the structure and the related connections of the image encoding apparatus of the first embodiment. In the following description of the first embodiment, four different example structures (see FIGS. 2, 7, 8, and 9 ) to a functional unit (a code amount control circuit 104 (see FIG. 1)) in the first embodiment will be disclosed.

Figure 1:
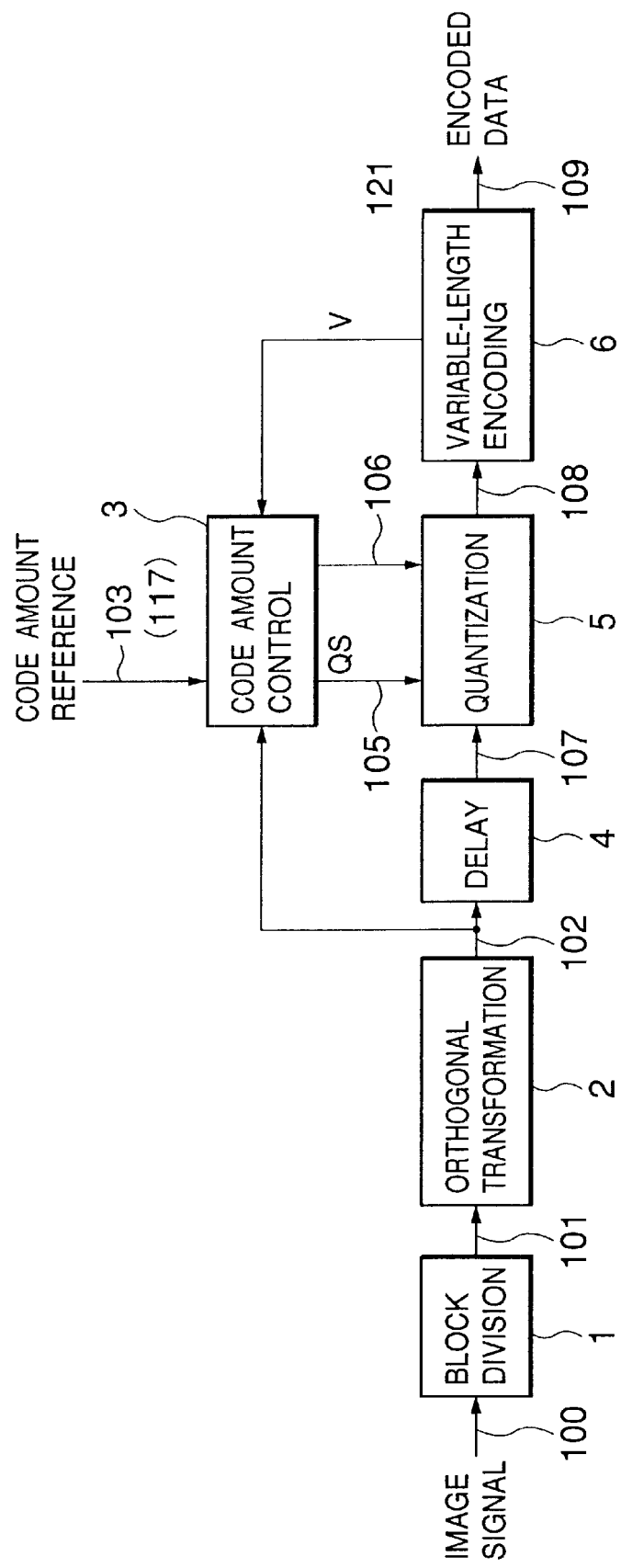
FIG. 1 shows the configuration of an image encoding apparatus of an embodiment according to the present invention.

FIG. 1 shows an example structure of the image encoding apparatus according to the present invention.

In reference to FIG. 1, image signals 100 entered to a block division circuit 1 are of digitized-image data, made up of a multi-valued monochrome image, RGB primary color signals, brightness signals, and two color-difference signals, etc.. The image signals 100 are divided into several predetermined blocks of pixels by the block division circuit 1, which then outputs block data 101.

An orthogonal transformation circuit 2 orthogonally transforms the block data 101, making a zig-zag scan transformation so that non-zero coefficients will come after another when they are subjected to the variable-length encoding, and then outputs orthogonal transformed coefficients 102. In general, the 8×8 2-dimensional Discrete Cosine Transformation (DCT) is utilized for the orthogonal transformation. Alternatively, another kind of transformation approach may also be utilized.

A code amount control circuit 3 calculates a quantization step value 105 and a quantization number 106, which will restrict the number of coefficients in a macroblock to be quantized, in a macroblock unit, using both the sum of the absolute values of the transformed coefficients of respective blocks and a code amount cumulative value 104 output from a variable-length encoding circuit 6, and then outputs them to a quantization circuit 5. The quantization number 106 is set in accordance with each of different structures of the code amount control circuit 3 of the embodiment (which will be detailed later), and then output to a quantization circuit 5. For example, each code amount control circuit 3 of a first to third example structures (to be described later) always outputs "sixty-four" as a quantization number 106. Otherwise, it adaptively outputs one of the "one" to "sixty-four" in accordance with both a macroblock number 130 (see FIG. 9 ) and a differential quantization step value 119 (see FIG. 9). Details of this operation will be described later with reference to FIG. 9.

A delay circuit 4 delays the orthogonal transformed coefficients 102 for the necessary number of clock pulses, which will be necessary for a quantization circuit 5 to make an analysis of the orthogonal transformed coefficients 102. It then outputs a delayed transformed coefficients 107 to the quantization circuit 5.

The quantization circuit 5 quantizes the delayed transformed coefficients 107, using the quantization step value 105 and a quantization matrix to be used to weight for each different frequency. It then outputs the quantized transformed coefficients 108 to a variable-length encoding circuit 6. Note that "zero" is an output to the variable-length encoding circuit 6 for excessively transformed coefficients more than the quantization number 106, output from the code amount control circuit 3.

The variable-length encoding circuit 6 variable-length encodes the quantized transformed coefficients, utilizing the run-length encoding method, or the entropy encoding method, such as the Huffman coding method, and then outputs them as encoded data 109. It also outputs a cumulative code amount 104 for a frame to the code amount control circuit 3. Note that the cumulative code amount 104 is initialized with "zero" before image signals in a frame is entered.

Next, several different example structures of the code amount control circuit will be described in detail.

First Example Structure of the Code Amount Control Circuit

Figure 2:
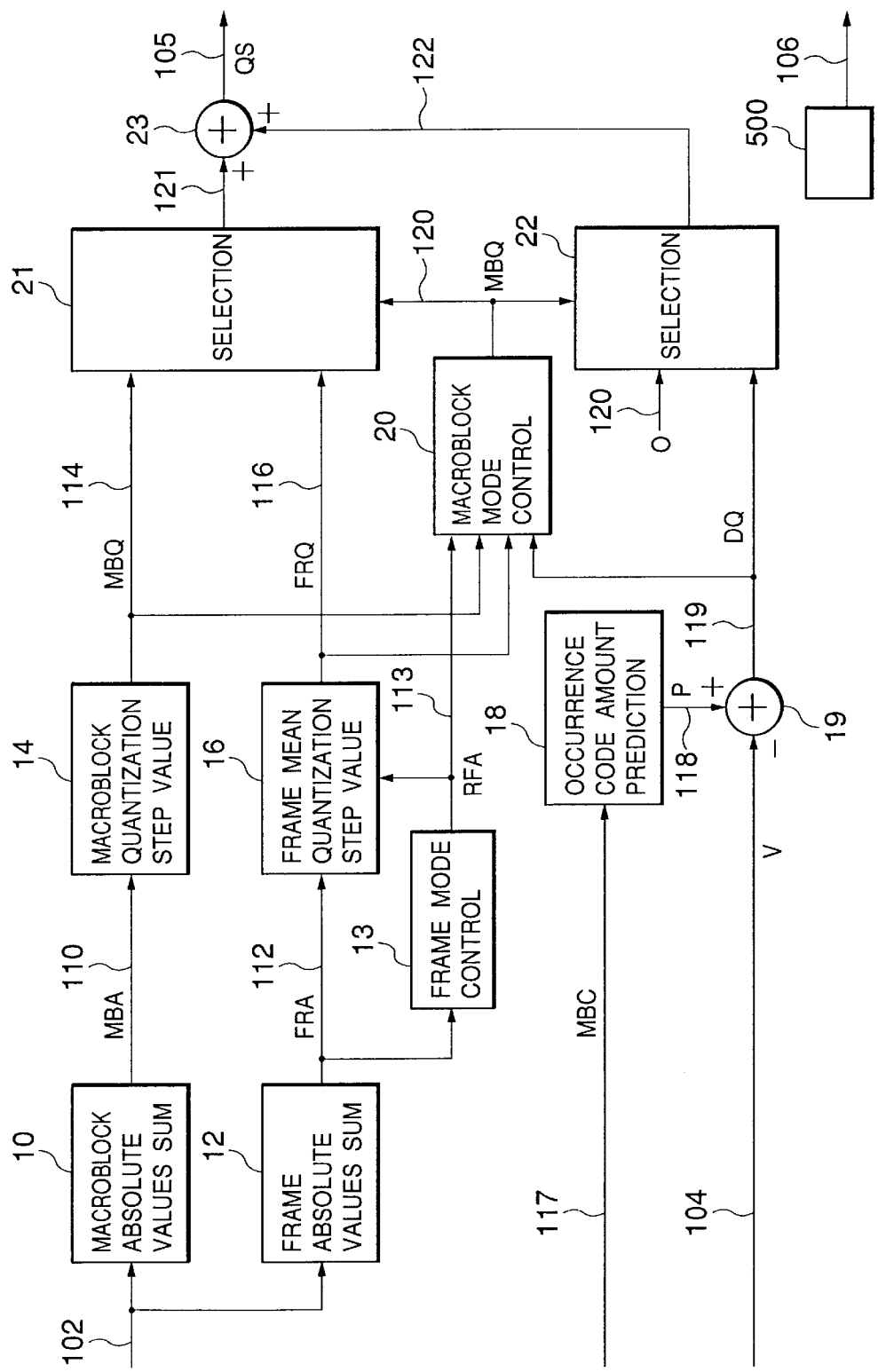
FIG. 2 shows a first example structure of a code amount control circuit.

FIG. 2 shows a detailed first example structure of the code amount control circuit 3.

A macroblock absolute values summation circuit 10 calculates the sum (110) of the absolute values of the transformed coefficients 102 in each macroblock, outputting it to a macroblock quantization step value calculation circuit 14.

A macroblock quantization step value calculation circuit 14 calculates a macroblock quantization step value 114 from the macroblock absolute values sum 110. Calculation means will be described in detail later.

A frame absolute values summation circuit 12 calculates the sum 112 of the absolute values of the transformed coefficients 102 in each frame, outputting it to both a frame mode control circuit 13 and a frame mean quantization step value calculation circuit 16.

A frame mode control circuit 13 makes a comparison of the frame absolute values sum 112 to a given threshold value to determine an encoding mode 113 in terms of complexity of the entered image. It then outputs the encoding mode 113 to both the frame mean quantization step value calculation circuit 16 and a macroblock mode control circuit 20.

The frame mean quantization step calculation circuit 16 adaptively calculates a frame mean quantization step value 116 through utilization of both the frame absolute values sum 112 and the frame mode 113, outputting it to both the macroblock mode control circuit 20 and a selection circuit 21.

An occurrence code amount prediction circuit 18 is initialized with "zero" before a frame-unit image is entered and processed. It then accumulates a macroblock allocation code amount 117 in a macroblock unit, outputting it as a predictive code amount 118, to a subtracter 19.

The macroblock allocation code amount 117 (MBC) for a macroblock within each frame is given as a constant. To encode image signals in NTSC(national Television System Committee color television) or PAL(Phase Alternation by Line System) system, the macroblock allocation code amount 117 is determined using the following expression Eq100; wherein RCA denotes a code amount reference, PCR the number of frames per second, and MBN the number of macroblocks per frame:

$$MBC=RCA/(PCR*MBN) \qquad \text{Eq100}$$

The following table 1 shows several standards of the NTSC and PAL systems.

TABLE 1

| | System | PCR | MBN | Size |
|---|---|---|---|---|
| (a1) | NTSC | 29.97 | 1440 | 720 pixels by 512 lines |
| (a2) | NTSC | 29.97 | 1350 | 720 pixels by 480 lines |
| (b1) | PAL | 25.00 | 1620 | 720 pixels by 576 lines |
| (b2) | PAL | 25.00 | 1710 | 720 pixels by 608 lines |

In the case of (a2) with a code amount reference of 25 Mbits/s, MBC will be given in such a way as follows:

$$MBC=25,000,000/(29.97 * 1350)=617.9 \text{ bits}\approx 617 \text{ bits}$$

In the same manner, for other standards (a1), (b1), and (b2), a corresponding MBC can be calculated using the equation Eq100.

Alternatively, the macroblock allocation code amount 117 for a macroblock in each frame can be adaptively determined with the macroblock allocation code amount calculation circuit 17 and the frame absolute values summation circuit 12 (shown in FIG. 7) being added to the circuit of FIG. 2. With this additional structure, the macroblock allocation code amount 117 may be changed for each slice. Detail of the circuits 17 and 12 will be given later with reference to FIG. 7.

The adder 19 subtracts the code amount cumulative value 104 output by the variable-length encoding circuit 6, from the predictive code amount 118, and then drops lower bits. It then outputs the result as a differential quantization step value 119 to both the macroblock mode control circuit: 20 and a selection circuit 22.

The macroblock mode control circuit 20 determines and outputs a macroblock mode 120 to the selection circuits 21 and 22 through a use of the frame mode 113, the macroblock quantization step value 114, the frame mean quantization step value 116, and the differential quantization step value 119. How to determine the macroblock mode will be detailed later.

The selection circuit 21 adaptively chooses between the macroblock quantization step value 114 and the frame mean quantization step value 116, and then outputs the result as a chosen reference quantization step value 121 to an adder 23, through a control by the macroblock mode 120.

The selection circuit 22 selects "zero" 120 when the selection circuit 21 chooses the macroblock quantization step value 114 through the control of the macroblock mode 120. Otherwise, it chooses the differential quantization step value 119, and then outputs the chosen value as a differential quantization step value 122 to the adder 23.

The adder 23 adds the chosen reference quantization step value 121 to the chosen differential quantization step value 122, and then outputs the result as a quantization step value 105 to the quantization circuit 5.

A register 500 stores the quantization number 106 which is predetermined in accordance with each the of different structures of the code amount control circuit 3 of the embodiment (which will be detailed later). It also outputs the stored value to a quantization circuit 5. For example, the register 500 of a first to third example structures (to be described later) of the code amount control circuit 3 always stores and outputs "sixty-four" as a quantization number 106. Otherwise, using a circuit shown in FIG. 9 in place of the register 500, the circuit adaptively outputs one of the "one" to "sixty-four" in accordance with both a macroblock number 130 (see FIG. 9) and a differential quantization step value 119 (see FIG. 9). This configuration will be described later in detail.

Next, the operation of the first example structure of the code amount control circuit 3 will be detailed with reference to FIGS. 2 and 3.

Figure 3:
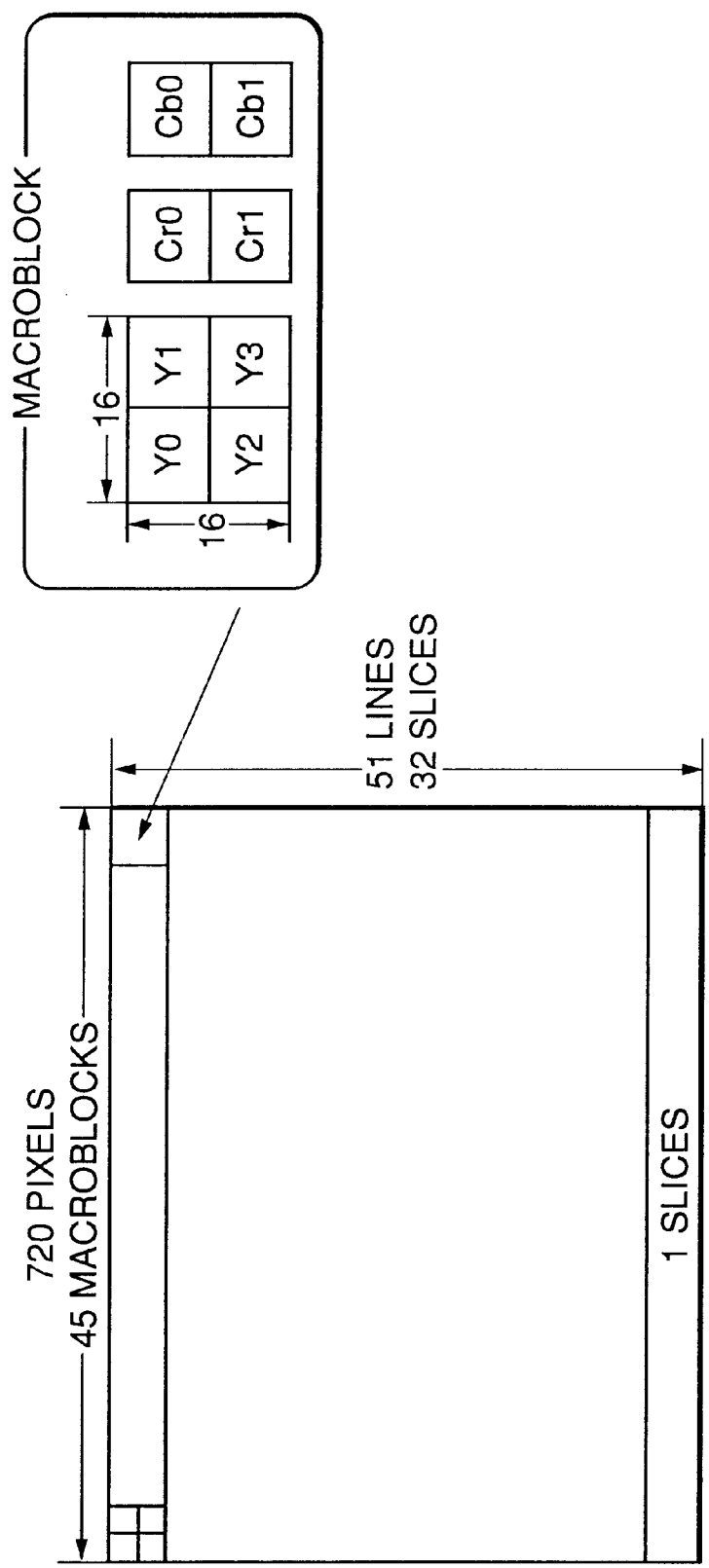
FIG. 3 shows an example format of an entered image.

FIG. 3 shows the structure of an entered image, as an example. A one block is made up of 8 lines by 8 pixels. A one macroblock is made up of eight DCT (Discrete Cosine Transform) blocks which includes both four intensity signal blocks Y0 to Y3 comprised of 16 lines by 16 pixels and two kind of four color-difference signal blocks Cr0, Cr1, Cb0, and Cb1 corresponding to respective intensity signal block positions (a first kind of them are comprised of two blocks, and a second kind, the rest of the two blocks). The two color-difference signal blocks Cr0, Cr1 are in hue, while the rest Cb0 and Cb1 are in saturation, as an example. A one slice is made up of 16 lines by 720 pixels, or 45 macroblocks. A one frame is made up of 1440 macroblocks, or 32 slices.

The macroblock absolute values summation circuit 10 calculates the sum of the absolute values of the respective sixty-four DCT coefficients F(u, v) within each block in a macroblock unit. The $k^{th}$ macroblock absolute values sum MBA[K] is calculated using the following equation Eq1; wherein u denotes the horizontal frequency of a transformed coefficient within a block, v the vertical frequency and, i the identifier of each of eight DCT blocks within each macroblock.

$$MBA[k] = \sum_{i=0}^{7}\sum_{u=0}^{7}\sum_{v=0}^{7} |F(u, v)| \quad \text{Eq1}$$

The frame absolute values summation circuit 12 calculates a frame absolute values sum (FRA) using the following equation Eq2.

$$FRA = \sum_{k=0}^{1439} MB \quad \text{Eq2}$$

The frame mode control circuit 13 compares the frame absolute values sum FRA with two kinds of given thresholds THF, THC (THF<THC), respectively, to classify an entered image into three different categories: An ordinary image (RFM=0), A little complicated image (RFM=1), and a complicated image (RFM=2).

$$RFM = \begin{vmatrix} 0 & \text{if } FRA < THF \\ 1 & \text{if } THF < FRA < THC \\ 2 & \text{others} \end{vmatrix} \quad \text{Eq3}$$

In conformity with the classification by the frame mode RFM, the frame mean quantization step value calculation circuit 16 calculates a frame mean quantization step value FRQ for a frame with 1440 macroblocks, using the following equation Eq4 with both the frame absolute values sum FRA and constants C0, C1, and C2.

$$FRQ = \begin{vmatrix} C0 * (\text{int } FRA/1440) & \text{if } RFM = 0 \\ C1 * (\text{int } FRA/1440) & \text{if } RFM = 1 \\ C2 * (\text{int } FRA/1440) & \text{if } RFM = 2 \end{vmatrix} \quad \text{Eq4}$$

Wherein, the term "FRA/1440" represents a mean macroblock absolute values sum for a frame. The constants C0, C1, and C2 are predetermined in accordance with the relation between the absolute values sum and a generated code amount, and depending on the entirety of the code amount reference, the quantization matrix used in the quantization circuit 5, and/or a variable-length encoding table used in the variable-length encoding circuit 6, etc.. The following equation Eq7 shows specific constants C0 to C2 for the code amount reference of 25 Mbits/sec.

Equations Eq5 and Eq6 are both given in accordance with Eq7.

$$C0 = 1/1024 \quad \text{Eq5}$$

$$C1 = (1/1024) + (1/4096) = (5/4096) \quad \text{Eq6}$$

$$C2 = 1/512 \quad \text{Eq7}$$

Figure 4:
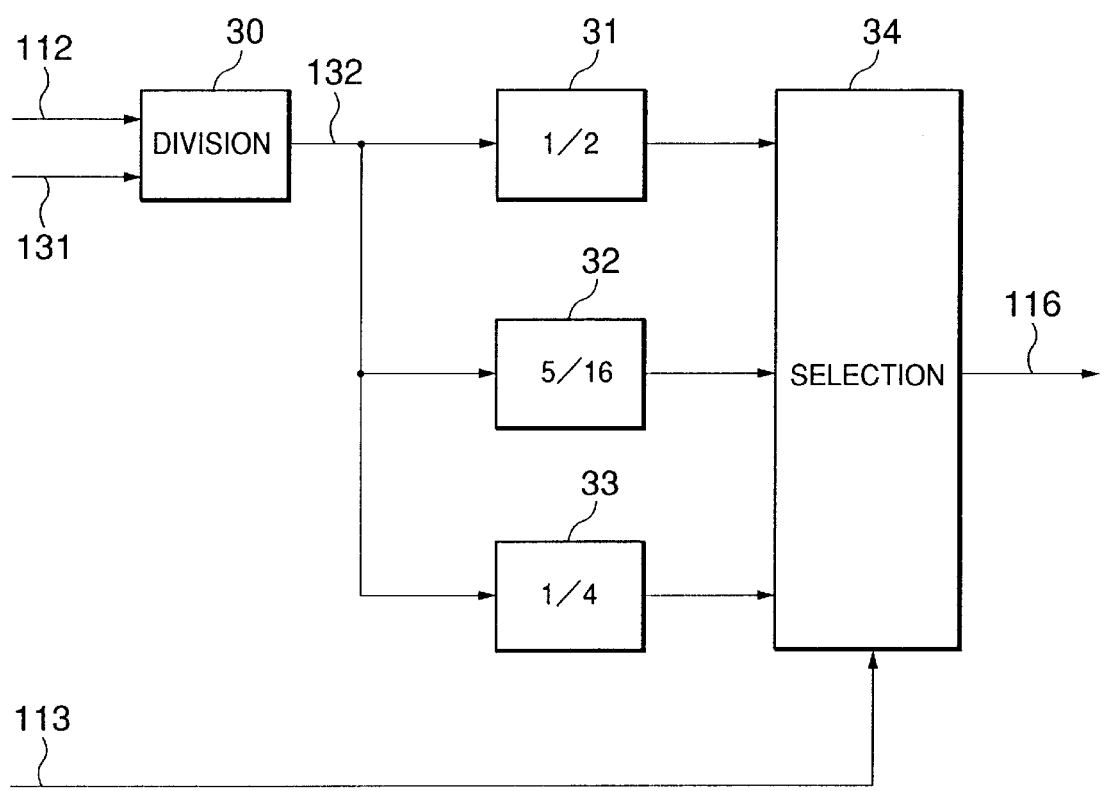
FIG. 4 shows an example configuration of a circuit adaptively calculating a frame mean quantization step value.

FIG. 4 shows a specific structure of the frame mean quantization step value calculation circuit 16 adaptively calculating the frame mean quantization step value (FRQ) in conformity with the equation Eq4. In the circuit shown in FIG. 4, the lower bits of respective constants C0, C1, and C2 are cut off into "¼", "5/16", and "½" sections (shown in circuits 33, 32, and 31,) respectively, downsizing the circuit. The circuit is also configured with adders; except for any multiplier, enabling for a smaller circuit size.

The operation of the circuit shown in FIG. 4 will now be detailed. To calculate the frame mean quantization step value FRQ, the frame absolute values sum FRA (112) are both entered with a divider of 30 as a dividend and a divisor of 1440 (113). The former is then divided by the latter with the divider of 30. The result of the division is sent to all circuits 31, 32, and 33, which then multiplies the result by respective numbers ½, 5/16, and ¼, (corresponding to the constants C2, C1, and C0, respectively) shown within the boxes of the circuits 31, 32 , and 33. The three circuits 31, 32, and 33 then output the respective multiplied results to the selection circuit 34. The selection circuit 34 then selects one of the calculated three mean quantization step values in conformity with a control of the frame mode RFM (113), outputting the selected value as a frame mean quantization step value 116 (FRQ).

Figure 5:
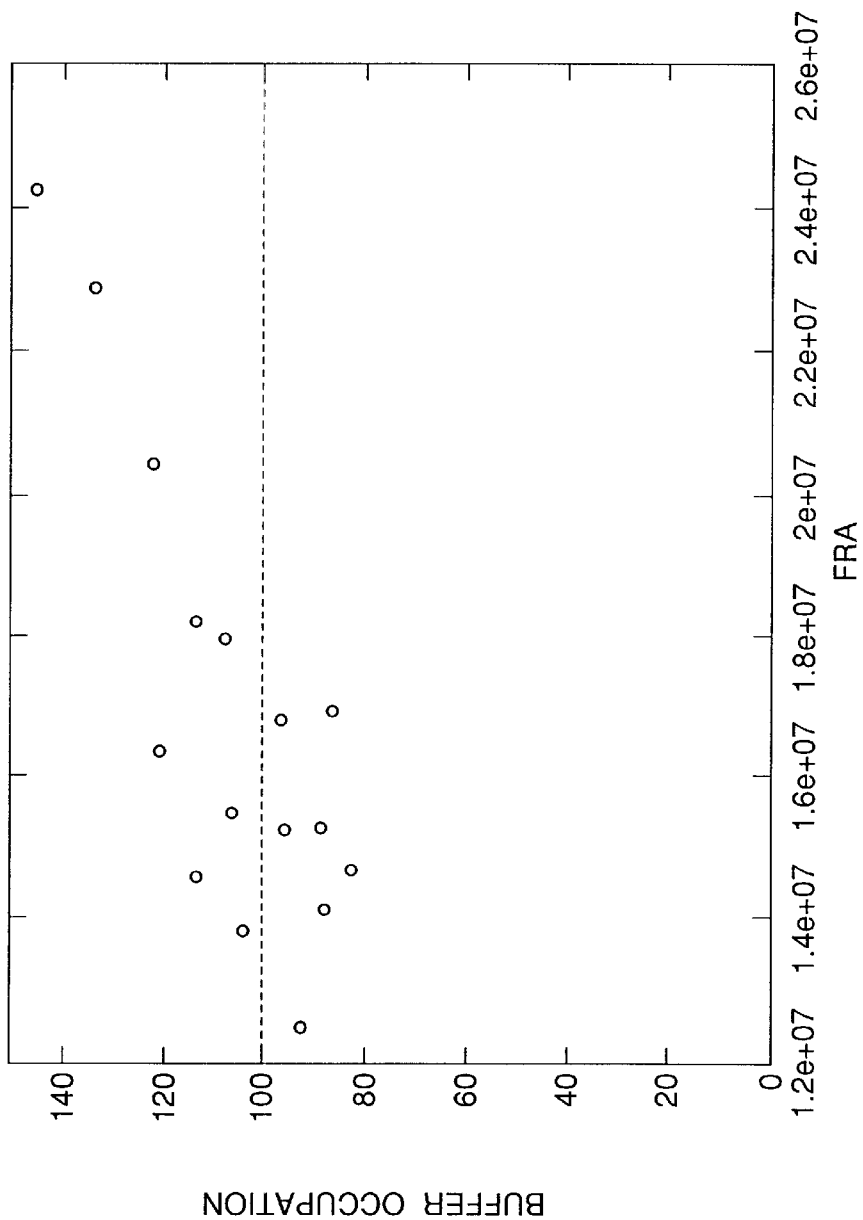
FIG. 5 is a graph showing the results from a feedforward control for calculating the frame mean quantization step value using a given constant.
Figure 6:
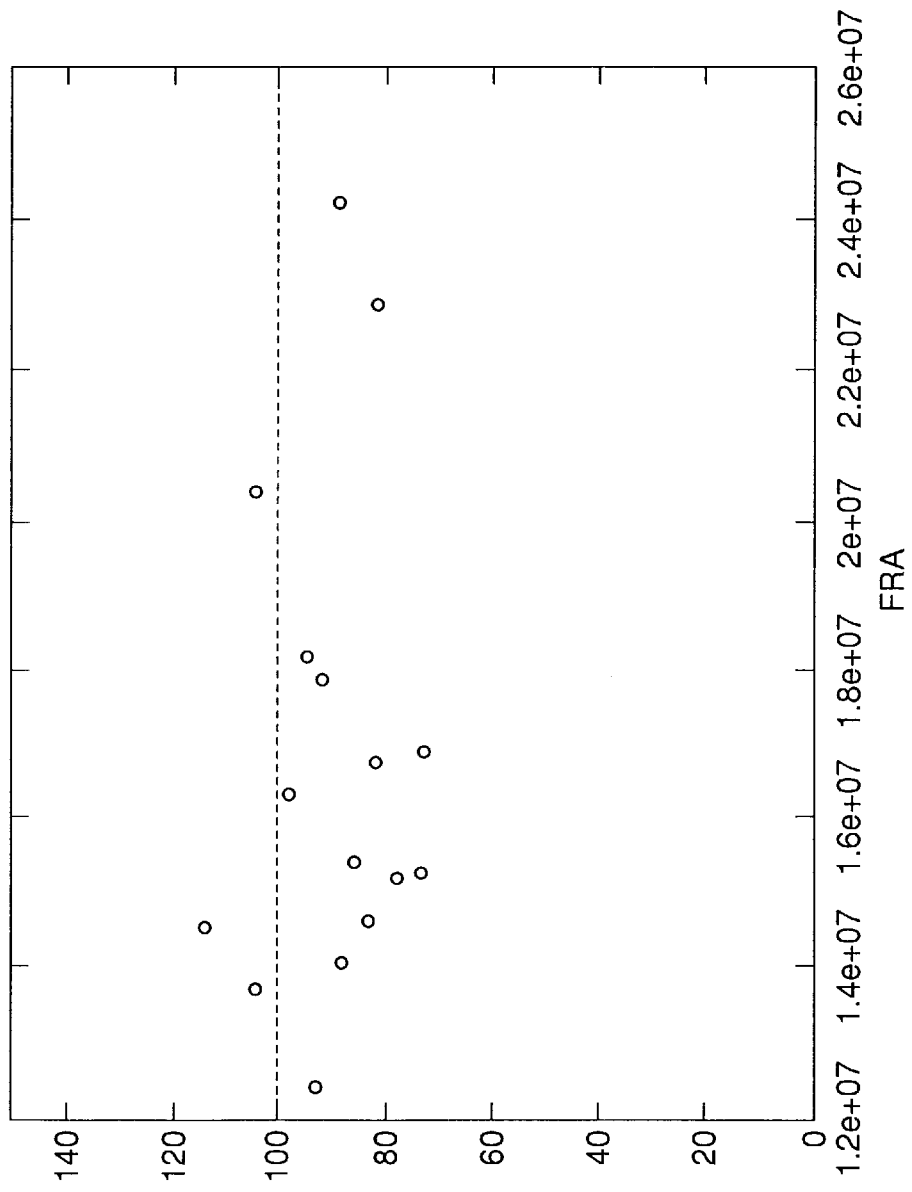
FIG. 6 is a graph showing the results from a feedforward control for calculating the frame mean quantization step value adaptively using three given constants.

FIGS. 5 and 6 are both graphs showing the rates of the code amount output from the variable-length encoding circuit to the code amount reference, which are put along the vertical line, the rates corresponding to respective frame absolute values sums FRAs; which are put along the horizontal axis. FIG. 5 shows the results when the frame mean quantization step value FRQ is calculated using no more than the constant C0, and also the whole of the macroblocks in a frame are then subjected to quantization using the FRQ. On the other hand, FIG. 6 shows the results when the frame mean quantization step FRQ is calculated using three constants C0, C1, and C3, and also the whole of the macroblocks in the frame are also then subjected to quantization using the FRQ. Both broken lines in FIGS. 5 and 6 indicate an agreement level between each of predictive code amounts and the given code amount reference. The results shown in FIG. 5 have shown the fact that the predictive code amounts corresponding to higher FRAs miss far from the given code amount reference. Conversely, the results (shown in FIG. 6) of the example structure of the first embodiment; which adaptively calculates the frame mean quantization step value FRQ, has shown the fact that all rates are close to the agreement level, enabling for successfully encoding in a vicinity of the code amount reference.

Note that the kinds of thresholds are used for the frame mode control are not necessarily limited to be the two thresholds (THF and THC); three thresholds or more can be utilized to classify an entered image into finer categories.

The macroblock quantization step value calculation circuit 14 calculates a macroblock quantization step value MBQ [k] in each macroblock unit, using the following equation Eq8 with the macroblock absolute values sum MBA [k].

$$MBQ[k]=\text{int}(MBA[k]/1024) \quad \text{Eq8}$$

Wherein, the divisor 1024 is an example value for the code amount reference of 25 Mbps, and another value can also be used in place of it.

With assumption that variable-length encoding processes until the $(K-1)^{th}$ macroblock would have completed, an occurrence code amount prediction circuit 18 calculates an predictive occurrence code amount P[k-1] until $(k-1)^{th}$ macroblock, by accumulating the constant, MBC given via the Equation Eq100. The predictive occurrence code amount P[k-1] will be used to subsequently calculate the $k^{th}$ macroblock quantization step value.

Alternatively, the predictive occurrence code amount P[k-1] can be calculated using the following equation Eq9. Note that a MBC shown in the equation Eq9 differs from the aforementioned constant MBC, and will be defined in the equation Eq15 shown in the description of a second example structure of the code amount control circuit. In addition to calculate the MBC, an additional circuit, specifically, a slice absolute values sum calculation circuit 11 is necessary to be attached to the circuit shown in FIG. 2.

$$P[k-1] = \sum_{j=0}^{k-1} MBC[\text{int } j/45] \quad \text{Eq9}$$

Wherein, the number "45" comes from the case where one slice is comprised of forty-five macroblocks. The number will change in accordance with the number of macroblocks per slice. The "int" operator in Eq9 plays a role of returning no more than the integer part of a subsequent number, or "j/45". In the following description, the operator "int" will be appeared having the same role.

A subtracter 19 calculates a differential quantization step value DQ [k-1] in accordance with the following equation Eq10 with both the code amount V[k-1] (cumulative code amount until $(k-1)^{th}$ macroblock) output from the variable-length encoding circuit 6(shown in FIG. 1) and the predictive code amount P[k-1] (cumulative predictive code amount until $(k-1)^{th}$ macroblock).

$$DQ[k-1]=\text{int}((V[k-1]-P[k-1])/2048) \quad \text{Eq10}$$

Wherein, the divisor 2048 is a control parameter for a convergence speed. The lower the divisor, the faster convergence is reached, and vice versa.

The macroblock mode control circuit 20 determines the macroblock mode using all of the frame mode 113, the macroblock quantization step value 116, and the differential quantization step value 119. Detail of the determination of the macroblock mode will be described below.

(1) If RFM=0, the entered image will be determined as an ordinary image in fineness from a frame mean viewpoint. Thus, the image is classified into one of two categories: A level macroblock (MBM[K]=0); and An ordinary macroblock (MBM[k]=2). When the macroblock quantization step value is low, and the differential quantization step value is negative (that is, encoding has been performed within the code amount reference or less), '0' is set to the macroblock mode MBM[k]. Otherwise, '2' is set to the MBM[k]. The following equation Eq11 shows more specific conditions for determination of MBM[k].

$$MBM[k] = \begin{cases} 0 & \text{if } MBQ < 4,\ MBQ[k] < FRQ,\ \text{and} \\ & \quad DQ[k-1] < 0 \\ 2 & \text{others} \end{cases} \quad \text{Eq11}$$

(2) If RFM=1, the entered image will be determined as a small complicated image from a frame mean viewpoint. Thus, the image is classified into one of three categories: A level macroblock (MBM[k]=0,) An ordinary macroblock (MBM[k]=1,) and A complicated macroblock (MBM[k]=2). The following equation Eq12 shows more specific conditions for the determination of MBM[k].

$$MBM[k] = \begin{cases} 0 & \text{if } MBQ < 4,\ (4*MBQ) < FRQ,\ \text{and } DQ[k-1] < 0 \\ 1 & \text{if } (4*MBQ) < FRQ \\ 2 & \text{others} \end{cases} \quad \text{Eq12}$$

(3) If RFM=2, the entered image will be determined as a complicated image from a frame mean viewpoint. Thus, the image is classified into one of three categories: A level macroblock (MBM[K]=0); An ordinary macroblock (MBM [K]=1); and A complicated macroblock (MBM[k]=2). The following equation Eq13 shows more specific conditions for determination of MBM[k].

$$MBM[k] = \begin{cases} 0 & \text{if } 4*MBQ < FRQ,\ \text{and } DQ[k-1] < 0 \\ 1 & \text{if } 2*MBQ < FRQ \\ 2 & \text{others} \end{cases} \quad \text{Eq13}$$

The $k^{th}$ macroblock quantization step value QS[k] is calculated using the following equation Eq14 with the RFM for the entered image and the MBM[k] local for a macroblock.

$$QS[k] = \begin{cases} |MBQ[k]| & \text{if } MBM[k] = 0 \\ |MBQ[k] + DQ[k-1]| & \text{if } MBM[k] = 1 \\ |FRQ + DQ[k-1]| & \text{if } MBM[k] = 2 \end{cases} \quad \text{Eq14}$$

To encode a macroblock with its mean far different from the mean of the whole of the image, the image is quantized in accordance with the characteristic of each macroblock through adaptively selecting either the macroblock quantization step value 114 or the frame mean quantization step value 116 as described earlier. This enables for successful prevention of degradation of the local image regions in quality. Furthermore, even if the referential quantization step value given from a feedforward control does not accord with the characteristic of the entered image, the image will be encoded in vicinity of the code amount reference. Obtained through a help of a feedback control using the differential quantization step value 122.

Second Example Structure of the Code Amount Control Circuit

Figure 7:
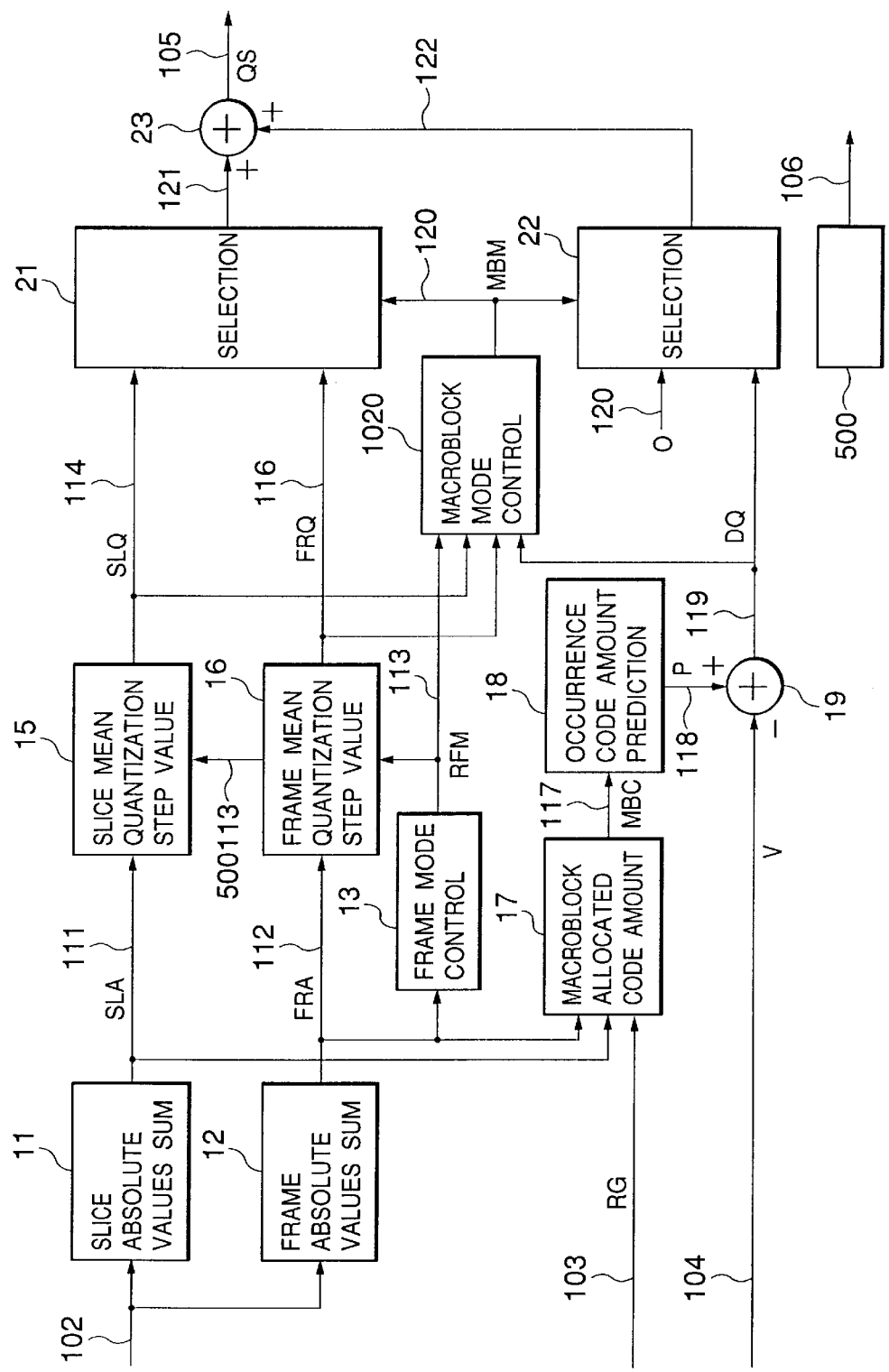
FIG. 7 shows a second example structure of the code amount control circuit.

FIG. 7 shows a second example structure of the code amount control circuit shown in FIG. 1, in detail.

To begin with, the different points of the second example structure from the first example structure of the code amount control circuit will be described below: A first point of difference is that a slice absolute values summation circuit 11 and a slice mean quantization step value calculation circuit 15 are both substituted for the macroblock absolute values summation circuit 10 and the macroblock quantization step value calculation circuit 14 in FIG. 2, respectively. A second point of difference is that a macroblock allocation code amount circuit 17 is added. A third point of difference is that a macroblock mode control circuit 1020 determines a macroblock mode 120 using a frame mode 113, a slice mean quantization step value 115 output from the slice mean quantization step value calculation circuit 15, a frame mean quantization step value 116 output from the frame mean quantization step value calculation circuit 16, and the differential quantization step value 119. (Note that identical referential numerals are attached to the same circuits in their operations in FIG. 7 as those in FIG. 2.)

In FIG. 7, the slice absolute values summation circuit 11 calculates the sum of the absolute values of the transformed coefficients for the m$^{th}$ slice (SLA[m]), outputting the result of a slice absolute values sum 111 to both a slice mean quantization step value calculation circuit 15 and a macroblock allocation code amount calculation circuit 17.

Figure 13:
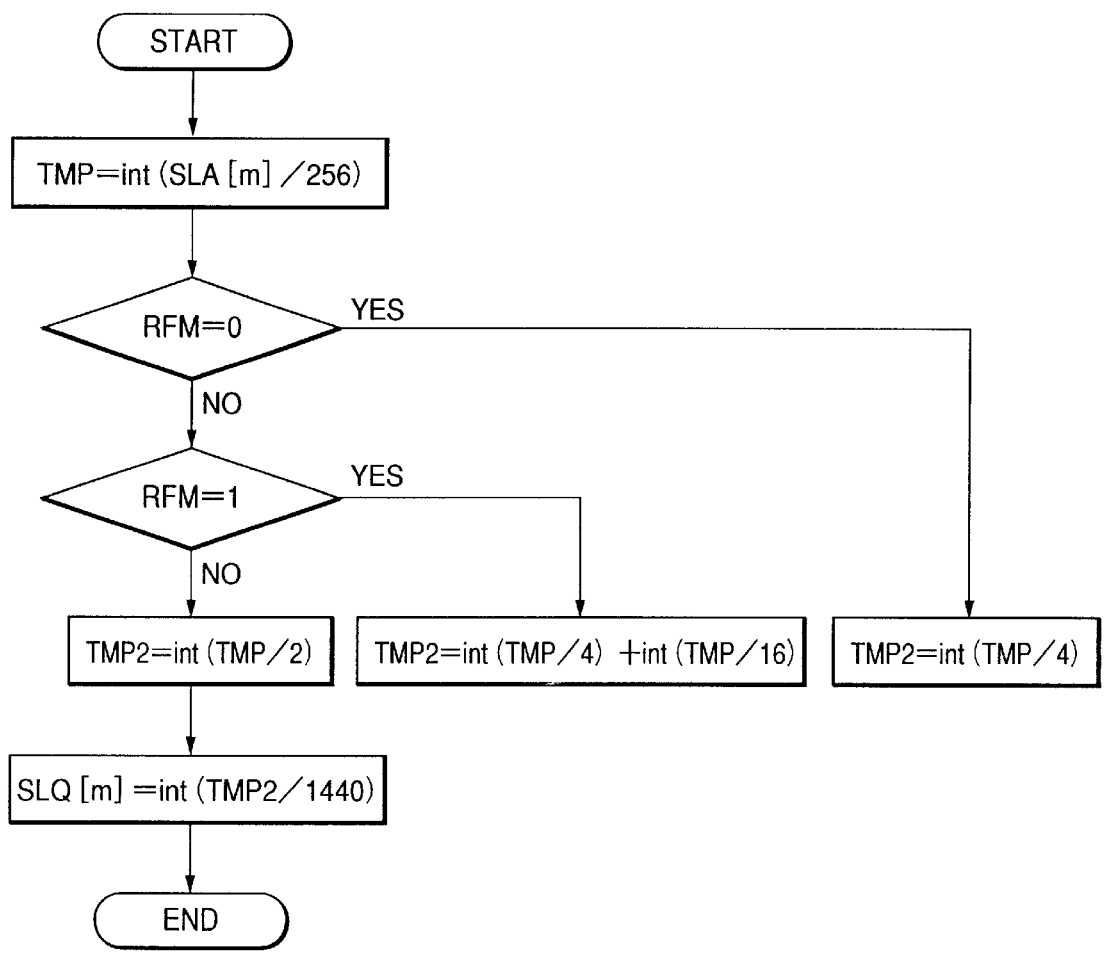
FIG. 13 is a flowchart showing the process of a slice mean quantization step value calculation.

The slice mean quantization step value calculation circuit 15 adaptively calculates the mth slice mean quantization step value SLQ[m](115) using both the slice absolute values sum 111 and the frame mode 113, outputting it to both a macroblock mode control circuit 1020 and a selection circuit 21. More specifically, the calculation is attained in conformity with the following equation Eq101:

The calculation of the equation Eq101 can be performed by a software program shown in a flowchart of FIG. 13. Since the processing in steps in FIG. 13 can be easily understood by those skilled in the art, with reference to the Eq101, a description of the flowchart is omitted.

The macroblock allocation code amount calculation circuit 17 calculates a macroblock allocation code amount 117 in a slice unit using both the slice absolute values sum 111 and the code amount reference 103, outputting it to an occurrence code amount prediction circuit 18. As an example, when the slice is made up of forty-five macroblocks, the macroblock allocation code amount circuit 17 calculates it using the following equation Eq15 with all a code amount reference RC$_T$, the m$^{st}$ slice absolute values sum SLA[m], and the frame absolute values sum FRA.

$$MBC[m] = (\text{int } SLA[m]/45) * (\text{int } RC_T/FRA) \quad \text{Eq15}$$

Wherein, the number "45" stands for the number of macroblocks in a slice. The number will change in accordance with the number of the macroblocks in a slice.

If RC$_T$=800000, FRA=15400000, SLA[0]=425000, and SLA[1]=350000, the 0th slice macroblock allocation code amount MBC[0] will be 490, and the 1st slice macroblock allocation code amount MBC[1] will be 404. Thus, For each macroblock in the 0$^{th}$ slice, a code amount of 4900 bits are allocated, while for each macroblock in the 1$^{st}$ slice, a code amount of 404 bits are allocated.

The macroblock mode control circuit 1020 determines the i$^{th}$ macroblock mode MBM[i] (120) using all the frame mode 113, the slice mean quantization step value 115, the frame mean quantization step value 116, and the differential quantization step value 119. Outputting it to both selection circuits 21 and 22.

With this manner described earlier, either the slice mean quantization step value 115 or the frame mean quantization step value 116 is adaptively selected, enabling for successful allocation of a code amount allocated for a macroblock to each slice even when an image is made up of two different image parts. For example, the upper part of the image that is a sky scene is placed, and the lower part, a flower bed is placed. Thus, a quality degradation of a local image area can be prevented through a quantization process in accordance with the characteristic of each macroblock. In addition, the image will be encoded in vicinity of the code amount reference with the help of a feedback control using the differential quantization step value 122, even when the code amount reference given from the feedforward control does not match the characteristic of the entered image.

Third Example of the Code Amount Control Circuit

Figure 8:
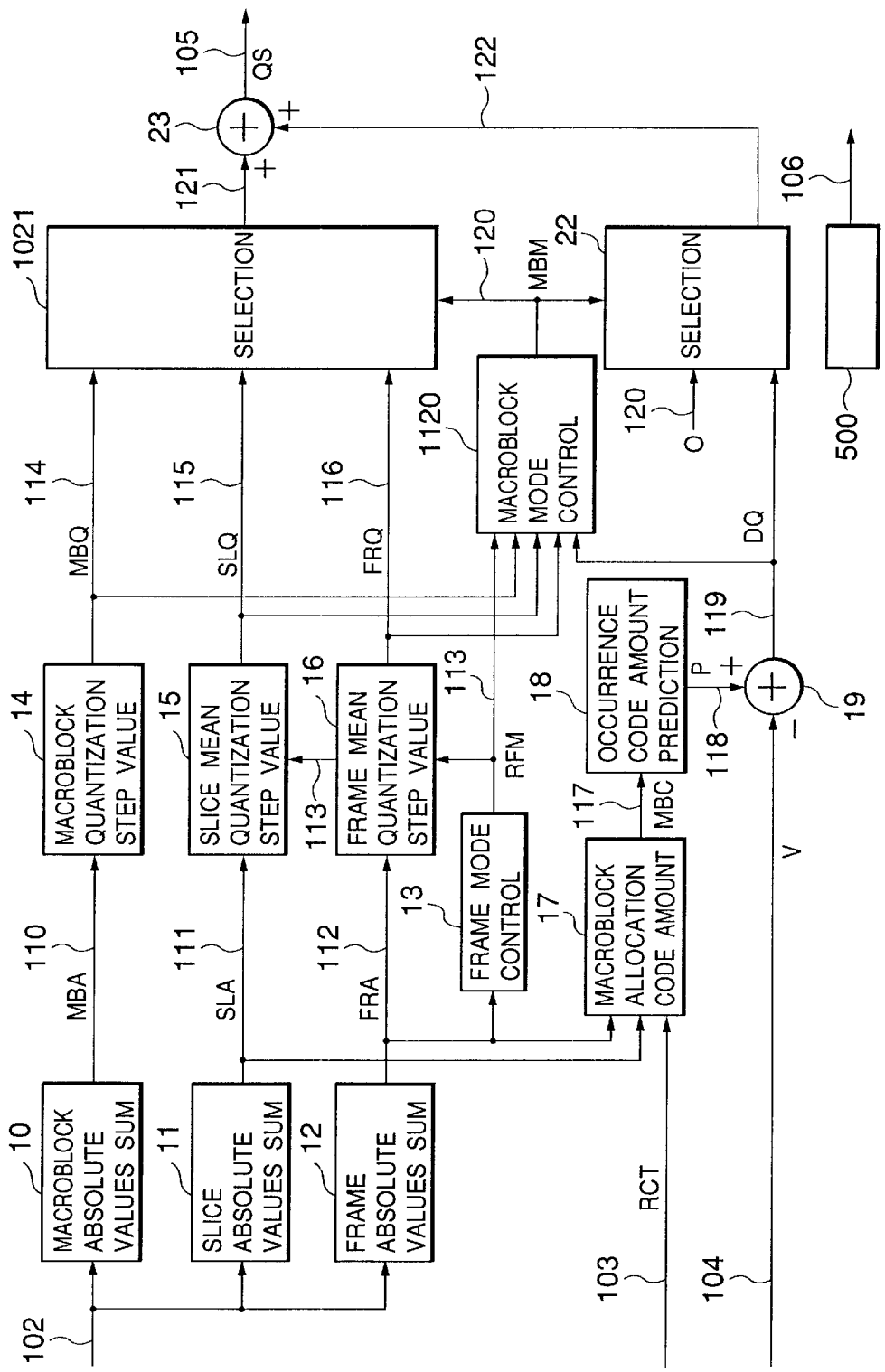
FIG. 8 shows a third example structure of the code amount control circuit.

FIG. 8 shows a third example structure of the code amount control circuit 3 in detail.

The points of difference the third example structure has from those of the first example example structure are as follows: A first point of difference is that the third example structure comprises an additional, macroblock absolute values summation circuit 10 and macroblock quantization step $$SLQ[m] = \begin{cases} |\text{int}(((\text{int}(SLA[m]/256))/4) + \text{int}(((\text{int}(SLA[m]/256))/16)| & \text{if } RFM = 1 \\ |\text{int}(((\text{int}(SLA[m]/256))/4)| & \text{if } RFM = 0 \\ |\text{int}(((\text{int}(SLA[m]/256))/2)| & \text{others} \end{cases} \quad \text{Eq101}$$

value calculation circuit 14; A second point of difference is that a macroblock mode control circuit 1120 (which corresponds to 1020 in FIG. 7)determines a macroblock mode 120 using all the frame mode 113, the macroblock quantization step value 114, the slice mean quantization step value 115, the frame mean quantization step value 116, and the differential quantization step value 119: A thirdpoint of difference is that the selection circuit 1021 adaptively selects one of the macroblock quantization step value 114, the slice mean quantization step value 115, and the frame mean quantization step value 116, in accordance with the macroblock mode 120: (Note that the same referential numerals are attached to corresponding identical circuits in FIG. 8 to those in FIG. 2.)

Figure 14A:
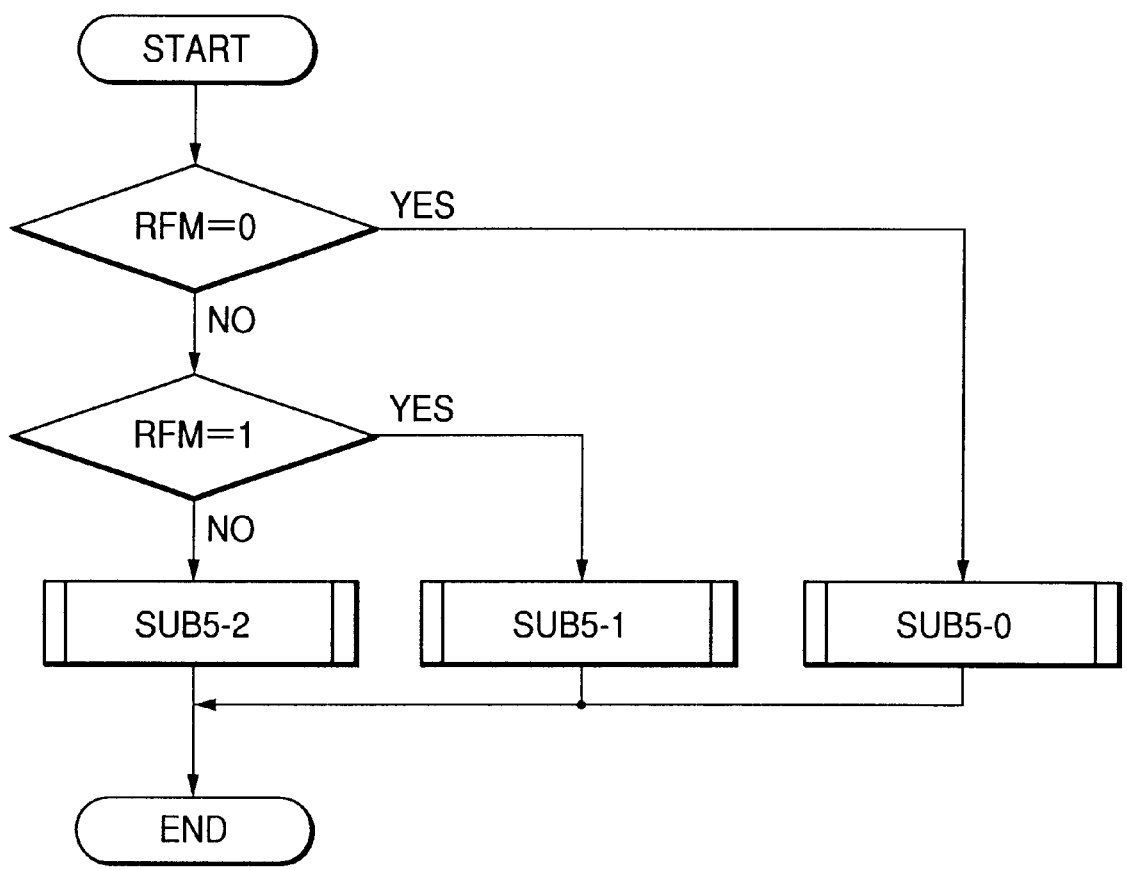
FIGS. 14A to 14D show the process of a macroblock mode control.
Figure 14B:
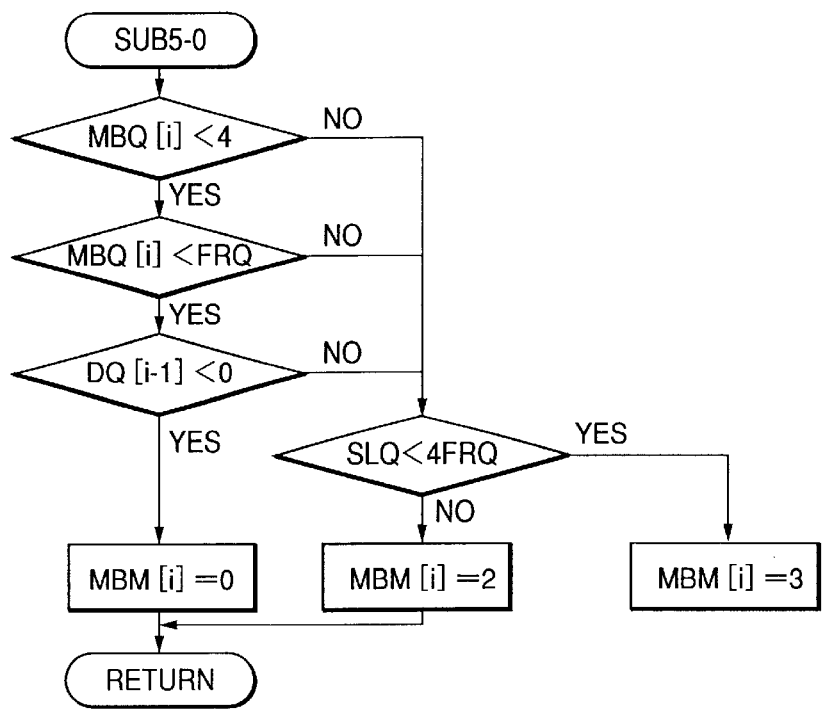
Figure 14C:
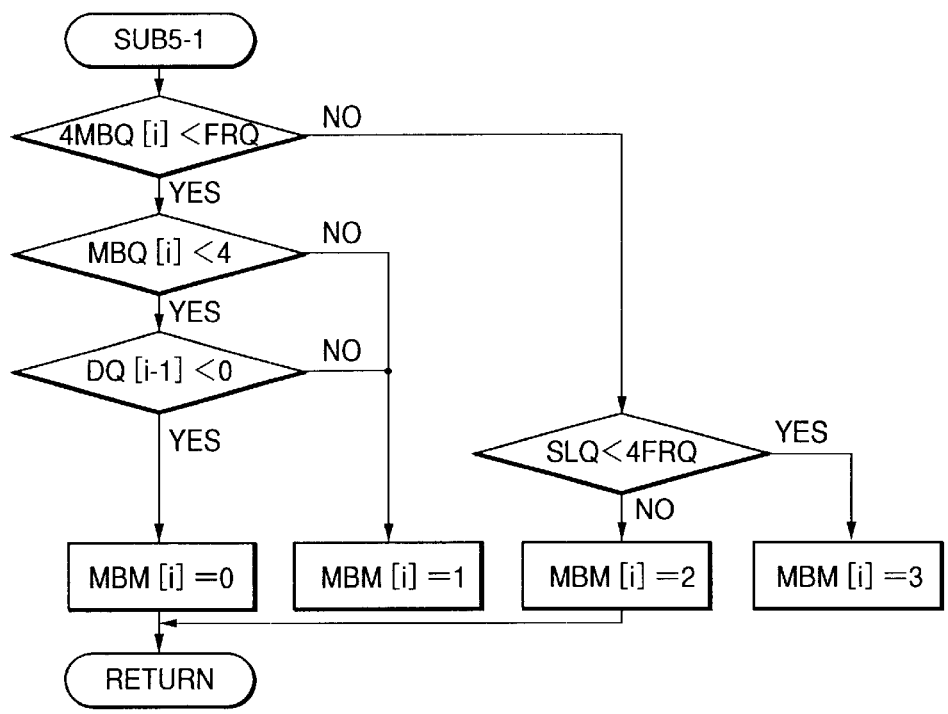
Figure 14D:
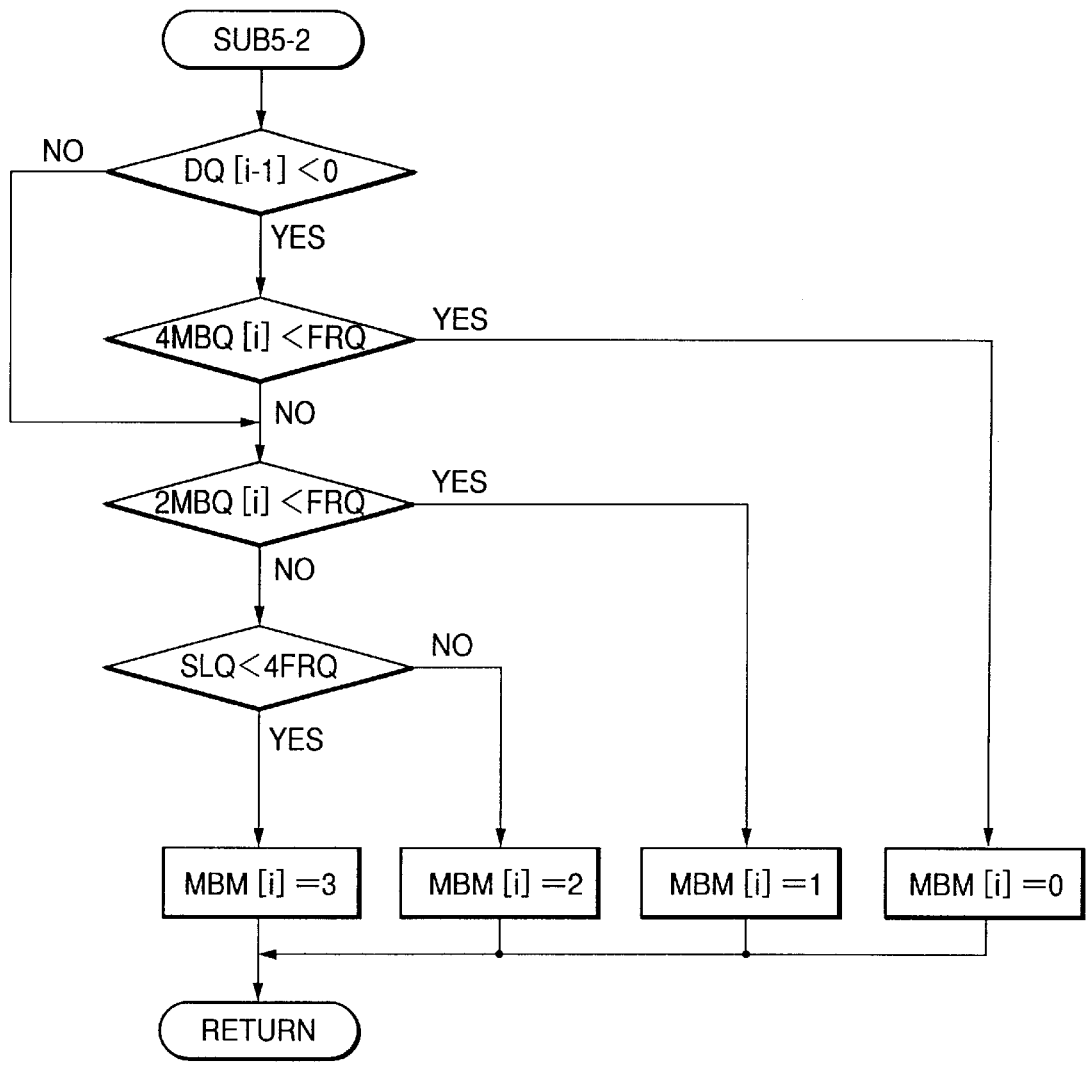

In the macroblock mode control circuit 1120, the $i^{th}$ macroblock mode MBM[i] is calculated in conformity with a given process shown in flowcharts of FIGS. 14A to 14D. FIG. 14A shows a main processing routine, while FIGS. 14B to 14D show its subroutines (each may be called from the main processing routine, dependent upon the RFM, and also return the value of MBM[i] to the main processing routine).

The quantization step value for an $i^{th}$ macroblock QS[i] will be calculated by a group of selection circuits 1021 and 22, and adder 23 in conformity of the following equation Eq102.

$$QS[i] = \begin{array}{ll} |MBQ[i] + 0 & \text{if } MBM[i] = 0 \\ |MBQ[i] + DQ[i-1] & \text{if } MBM[i] = 1 \\ |FRQ + DQ[i-1] & \text{if } MBM[i] = 2 \\ |SLQ[\text{int}(i/45)] + DQ[i-1] & \text{if } MBM[i] = 3 \end{array} \quad \text{Eq 102}$$

Wherein, each of the former terms MBQ[i], FRQ, and SLQ[int(i/45)] are selected by the selection circuit 121 in accordance with the MBM[i] output from the macroblock mode control circuit 1120. Each of the latter terms 0, and DQ[i–1] are selected by the selection circuit 22, in accordance with the MBM[i]. The adder 23 then adds the former selected term to a latter selected term, outputting the result as a quantization step value QS[i] to the quantization circuit 5 (shown in FIG. 1)

The code amount control circuit of the third example structure is a combination of the code amount control circuits in the first and second example structures. It changes over among the macroblock quantization step value 114, the slice mean quantization step value 115, and the frame mean quantization step value 116 in accordance with the characteristic of the entered image. Furthermore, even when the entered image is made up of different images in characteristic, a control is performed in accordance with an optimal quantization step value by changing the macroblock allocation code amount 117. Thus, further improvement in image quality will be made by more than that of each of the code amount control circuits in the first and second example structures.

Fourth Example Structure of the Code Amount Circuit

Figure 9:
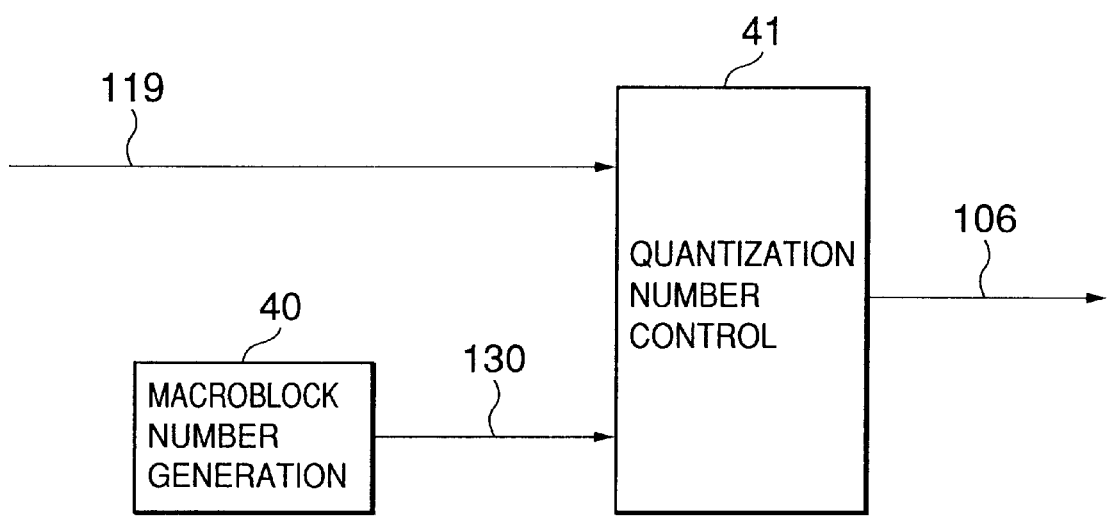
FIG. 9 shows a fourth example structure of a part of the code amount control circuit.

FIG. 9 shows a forth example structure of the code amount control circuit.

The fourth example circuit of the code amount control circuit enables for successful encoding within no more than the code amount reference, and by a combination of the code amount control circuits in the first, second and third example structures.

With reference to FIG. 9, a macroblock number generation circuit 40 is initialized with "0" before a quantization value for the first macroblock is calculated. The initialized value is then increased by one for the next macroblock, and output as a macroblock number 130 to a quantization number control circuit 41.

The quantization number control circuit 41 adaptively controls the number of coefficients within a block (to be quantized by the quantization circuit), using both the differential quantization step value 119 and the macroblock number 130.

As an example, for a frame made up of 1440 macroblocks, the quantization number control circuit 41 always outputs the number 64 to the quantization circuit 5, until the $959^{th}$ macroblock is processed. It then controls the number of coefficients to be quantized for the $960^{th}$ to $1439^{th}$ macroblocks, using the following equation Eq16, if the differential quantization step value 119 is positive (more specifically if the code amount output from the variable-length encoding circuit 6 exceeds the code amount reference).

$$CN[k] = \begin{array}{ll} |64 & \text{if } k < 960 \text{ or } DQ[k-1] < 0 \\ |64 - 2*DQ[k-1] & \text{if } k \geq 960, \text{ and } 0 < DQ[k-1] \leq 30 \\ |4 & \text{others} \end{array} \quad \text{Eq 16}$$

A brief explanation about the conditional terms in Eq16 will be given below. The present invention aims to perform inner-frame encoding process with a generated code amount per frame being controlled within a given target amount. Accordingly, when the previous conditional terms "k<960" or "DQ[k–1]<0" are satisfied in Eq16, sixty-four DCT coefficients will all be encoded. In other words, during the time when approximately two thirds of an image frame has been encoded, or when the image has successfully been encoded within the target code amount (code amount reference), sixty-four DCT coefficients will all be encoded. Otherwise, when the number of residual macroblocks not encoded is small (k>960,) and also the generated code amount has exceeded the code amount reference (0<DQ[k–1]<=30), the number of prospective encoded transformed coefficients will be forcefully decreased. This enables for successfully making a control of the code amount within the code amount reference. This approach will be very effective when the variable-length encoding circuit makes use of the run-length encoding method.

As described earlier, for an entered image including a lot of different information (which may cause the encoding process difficult to be converged), control of the number of quantized coefficients enables for successful encoding of the image within the code amount reference.

In each embodiment described above, the coding mode is changed over in accordance with the characteristic of an entered image, using both the sum of the absolute values of transformed coefficients in a block, and the code amount output from the variable-length encoding circuit, so that a code amount allocation can be properly made. A quantization step value is controlled in accordance with the characteristic of the image. This enables for successfully encoding the image within the code amount reference, even when the image includes parts with high compressed (encoded) ratios where degrading of the image quality may be easily recognized. Therefore, a reproduction of the image will be made in high quality.

Results of the First Embodiment

To sum up the operation of an image encoding apparatus of the first embodiment according to the present invention (shown in FIGS. 1 and 2,) the apparatus divides image signals (100) into small blocks with a plurality of pixels, making an orthogonal transformation of the blocks into orthogonal transformed coefficients (102), quantizes the coefficients(102), calculates a quantization step value (105) for each macroblock, and then variable-length encodes the quantized transformed coefficients (108), utilizing the run-length coding method or the Haffman coding method. Furthermore, the apparatus changes encoding mode in accordance with the characteristics of the image, using both the absolute values sum of transformed coefficients in each block, and the code amount output from a variable-length encoding unit. Thereby successfully performing a code amount allocation, to control a quantization step value in accordance with the characteristic of the image. Therefore, the image will be encoded within a target code amount (code amount reference), even when the image includes regions with high compressed ratios (where an image quality degrading may be easily recognized). In addition, reproduction of the image can be made in high quality.

Furthermore, according to another example structure of the image encoding apparatus of the first embodiment of the present invention (shown in FIGS. 1, 2, and 4,) an absolute values sum of transformed coefficients is calculated both in a macroblock unit and in a frame unit. By comparing the absolute values sum for a frame to a given threshold, and adaptively using predetermined several constant parameters, a frame mean quantization step value is calculated. Then, either a macroblock quantization step value or a frame mean quantization step value is adaptively selected in accordance with the amount of codes generated by the variable-length encoding circuit, a calculation between the selected step value and a differential quantization step value. Therefore, the image will be effectively encoded in a vicinity of a code amount reference, with preventing the image from degrading in quality, even in the case that the image has different characteristics.

Furthermore, according to an image encoding apparatus with a code amount control circuit (shown in FIG. 7), absolute values sums of transformed coefficients are calculated both in a slice unit and in a frame unit. By comparing the absolute values sum for a frame to the absolute values sum for a frame, and also adaptively using predetermined several constant parameters, a slice mean quantization step value and a frame mean quantization step value are both calculated. Then, by adaptively selecting either the macroblock quantization step value, or the frame mean quantization step value in accordance with the amount of codes generated by the variable-length encoding circuit, and by making a calculation between the selected step value and a differential quantization step value, the allocation code amount for each macroblock is changed for each slice. Therefore, the image will be effectively encoded in vicinity of a code amount reference, while preventing the image from degrading in quality. This is so even in the case where the image has different characteristics.

According to an image encoding apparatus with a code amount control circuit of the present invention (shown in FIG. 8), optimal quantization is made using a quantization step value in accordance with the characteristics of the image. By reducing the allocation code amount for image parts that are not easily recognized by the human eye while increasing the allocation code amount for level image parts where degradation is easily recognized. Therefore, the image will be successfully encoded within a given code amount, and reproduction of the image can be made in high quality.

According to the image encoding apparatus of the present invention (see FIG. 9), an image will be successfully encoded within a code amount reference through giving an upper limitation to the number of transformed coefficients subjected to quantization by a quantization circuit.

Second Embodiment of the Present Invention

In the first embodiment; including the first to fourth example structures described above, the image encoding apparatus is realized with a plurality of different circuits. Alternatively, in a second embodiment; an image encoding process equivalent in results to those of the first embodiment, according to the present invention, will be realized with a software program stored in a recording media uploaded to a computer 5000 (which will be described in detail later with reference to FIG. 11) Then further interpreted and executed by a CPU(Central Processing Unit) 5010 of the computer 5000. The software, more specifically; the processing program codes can be on a microprogram basis as well as on the machine code basis.

Figure 10A:
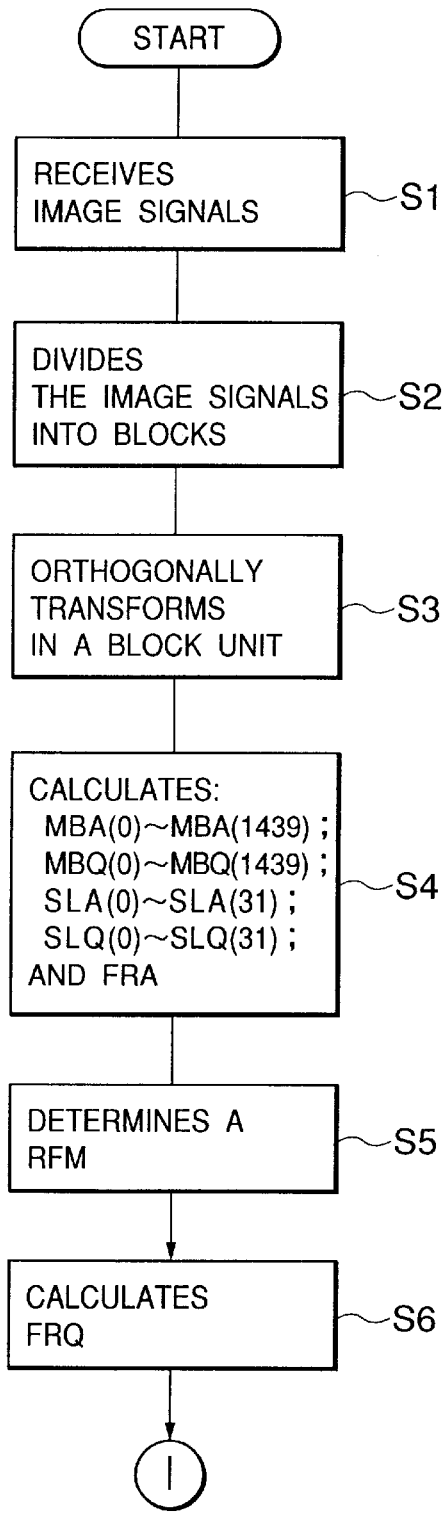
FIGS. 10A to 10C are flowcharts showing an encoding process according to the present invention.
Figure 10B:
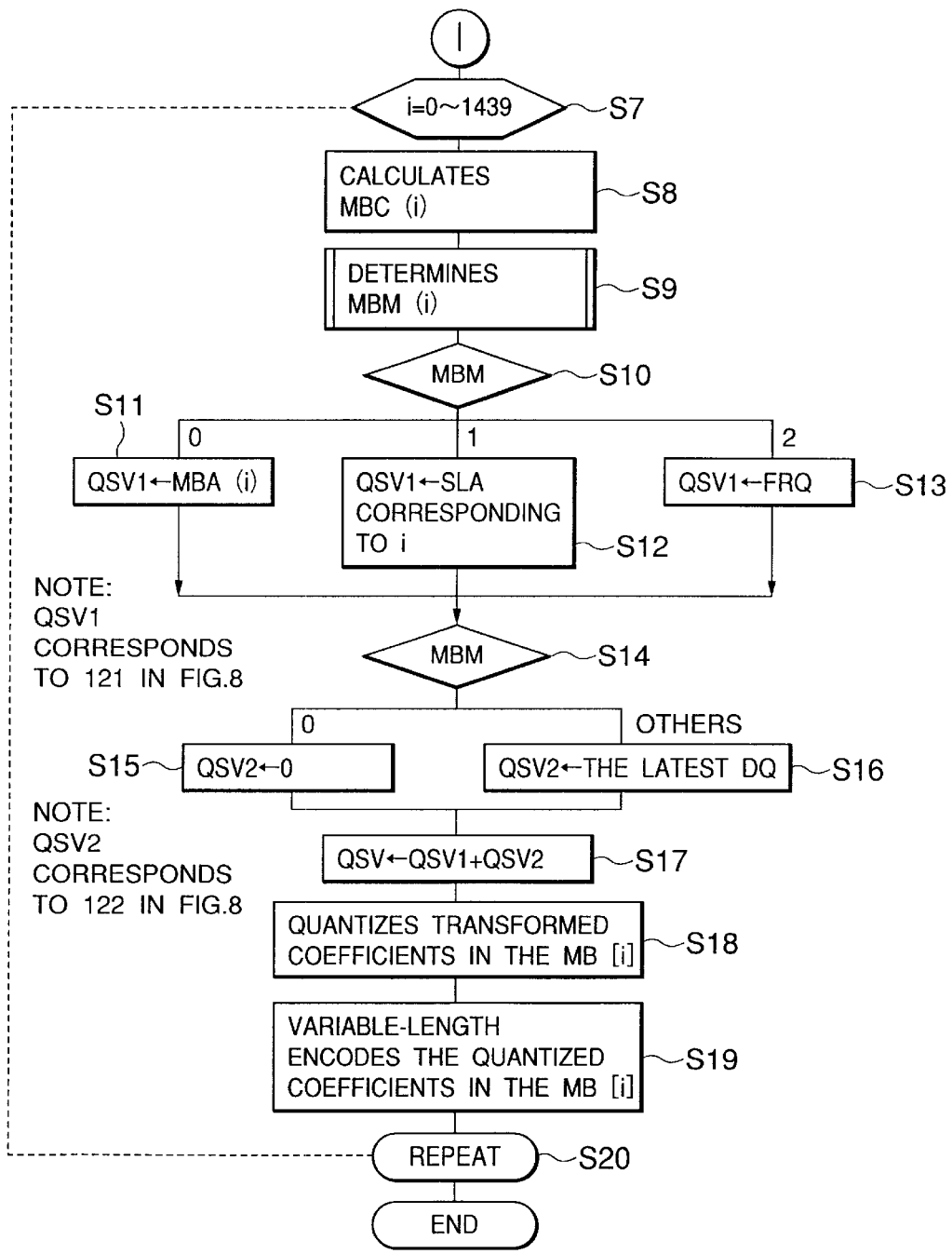
Figure 10C:
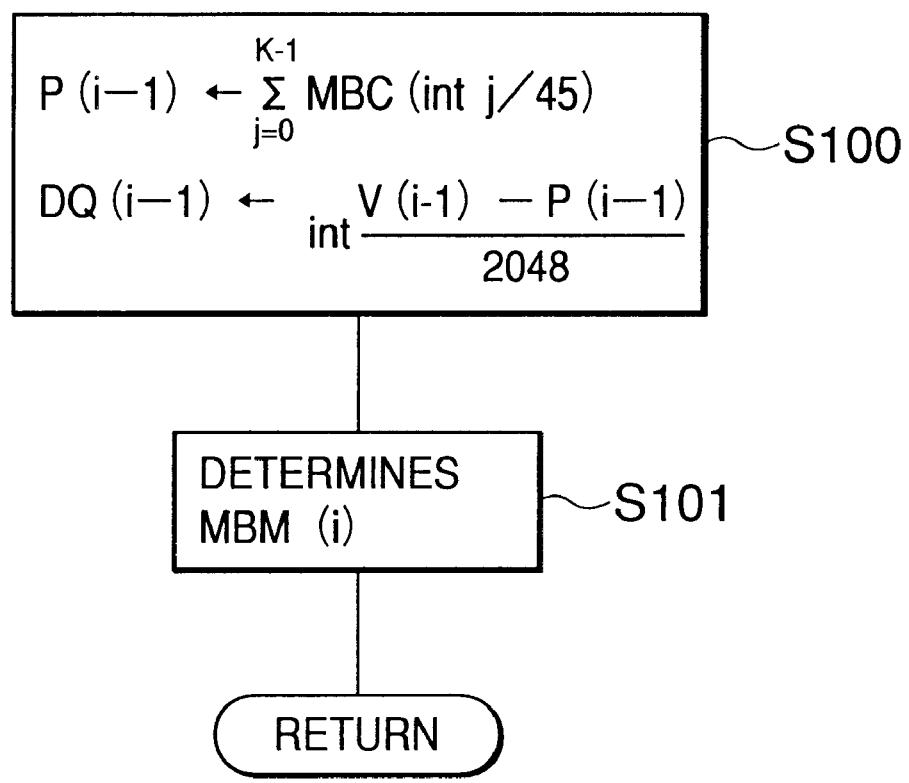

FIGS. 10A to 10C are flowcharts showing the process flow that realizes an image encoding method according to the present invention. The process flow generates equivalent results to the image encoding apparatus shown in FIGS. 1 and 8. FIGS. 10A and 10B show the main process flow, and. FIG. 10C a subprocess flow to step 8 in the main process flow.

Figure 11:
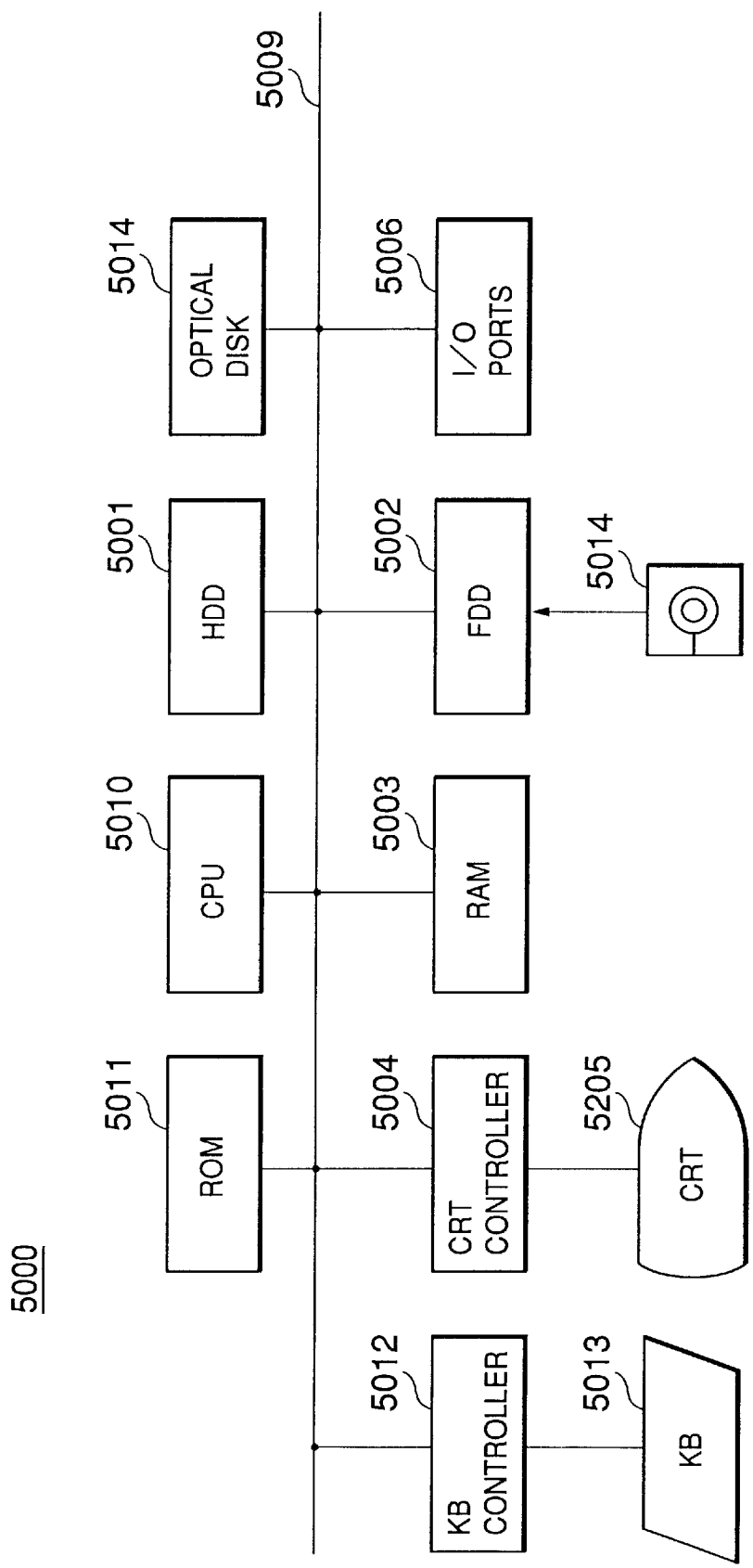
FIG. 11 shows the configuration of a computer performing the encoding process of the present invention.

In a step S1, image data (signals) in a one frame is received and stored in a RAM (Random Access Memory) 5003 (see FIG. 11). We assume here that the image data in a one frame is configured with the format shown in FIG. 3. Specifically, the one frame is made up of 1440 macroblocks, and thirty-two slices.

In a step S2, the stored image data is divided into a plurality of blocks as shown in FIG. 3. This step corresponds to the operation of the block division circuit 1 in FIG. 1.

In a step S3, each block of the divided image data is orthogonally transformed into transformed coefficients. This step corresponds to the operation of the orthogonal transformation circuit 2 in FIG. 1.

In a step S4, MBA[i](i=0, ... , 1439) (MacroBlock Absolute values sum), MBQ[i] (i=0, ... , 1439) (MacroBlock Quantization step value), SLA[m] (m=0, ... , 31) (SLice Absolute values sum), SLQ[m] (m=0, ... , 31) (SLice mean Quantization step value), and a FRA(FRame Absolute values sum) are all calculated using the transformed coefficients calculated in the step 3. The MBA[i](i=0, ... , 1439) and the MBQ[i] (i=0, ... , 1439) are both calculated using the equations Eq1 and Eq8, respectively. The SLA[m] (m=0, ... , 31) are obtained through the making of a summation of the absolute values of the transformed coefficients involved in each slice. Each of the SLQ[m] (m=0, ... , 31) is obtained by executing a process flow shown in FIG. 10D. This process flow realizes the calculation defined in the equation Eq101. The FRA is calculated using the equation Eq2.

In a step S5, a RFM (frame mode), which will indicate a complexity level of the image, is determined in conformity with the Equation Eq3.

In a step S6, a FRQ(FRame mean quantization step value) is calculated with following the equation Eq4.

In a step S7, control is made to repeat the operation of subsequent steps S8 to S19 1440 times(an index variable i continues to be incremented from 0 to 1439, every time step S7 is reached from a step S20).

In a step S8, the $i^{th}$ macroblock allocation code amount MBC[i] is calculated with following the equation Eq15.

In a step S9, a subroutine (shown in FIG. 10C) is called to determine the $i^{th}$ macroblock mode MBM[i]. When the subroutine is called, a step S100 (shown in FIG. 10C) will be executed. In the step S100, a predictive occurrence code amount for the $(i-1)^{th}$ macroblock P[i-1] is calculated with following the equation Eq9. A differential quantization step value for the $(i-1)^{th}$ macroblock DQ[k-1] is then calculated with following equation Eq10. In a step S101, A macroblock mode for the $i^{th}$ macroblock MBM[i] is determined in conformity with the equations Eq11, Eq12, and Eq13, and then returned to the main routine. A step S10 will then be executed.

In a step S10, the MBM[i] type is checked. Herein, if the value stored in the MBM[i] is 0, then the process branches to a step S11. If the value stored in the MBM[i] is 1, the process branches to a step S1 12. If the value stored in the MBM[i] is 2, process branches to a step S13.

In a step S11, a variable QSV2 is substituted for the value stored in the $i^{th}$ macroblock absolute values sum MBA[i]. The process then goes to a step S14. (Note that the QSV1 corresponds to the value 121 output from the selection circuit 1021 in FIG. 8.)

In a step S12, the variable QSV1 is substituted for the slice absolute values sum SLA corresponding to the variable i. The process then continues to the step S14.

In a step S13, the variable QSVL is substituted for the FRQ, then continues to the step S14.

In a step S14, MBM[i] is checked. Herein, if the value stored in the MBM[i] is 0, the process branches to a step S15. Otherwise, if the value stored in the MBM[i] is other than 0, the process branches to a step S16.

In a step S15, the variable QSV2 is substituted for the number 0, and then continues to a step A17.

In a step S16, the variable QSV2 is substituted for the value of the DQ[i-1 ]. The process then continues to a step S17.

In a step S17, a variable QSV is substituted for the sum of the variables QSV1 and QSV2.

In a step S18, the transformed coefficients of the $i^{th}$ macroblock MB[i] are subjected to quantization.

In a step S19, the quantized, transformed coefficients of the $i^{th}$ macroblock MB[i] are encoded.

In a step S20, the index variable i is determined whether it is within the range from 0 and 1439. If its answer is yes, process goes back to the step S7. If answer is no, the encoding process according to the present invention will end.

Note that the previously described process flow shows no more than an example to have encoded data according the present invention. Wherein, all array variable elements of the MBA, MBQ, SLA, and SLQ are calculated in a batch processing approach in the step S4. Needless to say, they can also be calculated in a sequential processing attitude in such a way that: each macroblock absolute values sum MBA and the macroblock quantization step value MBQ are both calculated one after another in turn, in synchronism with quantization of the transformed coefficients for each macroblock; and each of the slice absolute values sum SLA and corresponding slice mean quantization step value SLQ are also calculated one after another in turn, and in synchronism with quantizing the transformed coefficients for the next slice's first macroblock. This process may reduce the amount of memory area in a computer, where the encoding process of the present invention is to be performed for the necessary variables.

As many widely apparent different processing flows of the present invention can be made without departing from the spirit and scope thereof, it is to be understood that the invention is not limited to the specific processing flows thereof except as defined in the appended claims.

FIG. 11 shows the structure of a computer 5000 realizing the image encoding process described above with reference to FIGS. 10A to 10C of the second embodiment.

The computer is mainly controlled by a CPU 5000. The CPU reads in program codes from ROM(Read Only Memory) and/or RAM(Random Access Memory) 5003. Each code is interpreted and then executed in accordance with the interpretation. The program codes need to be stored in the ROM 5011 and/or RAM 5003 before the CPU 5010 starts its operation. When image encoding program codes according to the present invention described earlier with reference to FIGS. 10A to 10C are stored in a recording media such as a Floppy disk 5014, they are read in through a FDC (Floppy Disk Controller) 5002 into the RAM 5003, in conformity with a control by the CPU 5010. In this case, the CPU 5010 reads in, interprets, and then executes the codes in the RAM 5003. A HDD(Hard Disk Drive) 5001 can be an alternative recording media for the program codes in place of the Floppy disk 5014.

Processing results from processing by the CPU 5010 will be displayed on a CRT through a help of a CRT controller 5004. A Key Board 5013 allows an operator to enter a command and data, which will be processed by the CPU 5010, through a help of a Keyboard controller 5012.

A I/O (Input/Output) ports 5006 are provided for multi-purposes: to receive image data (signals ,) commands and other data such as the code amount reference 103 (see FIG. 1); and to output encoded data (signals ,) and other related connections.

An optical disk 5014 stores the results of the encoded image data. Needless to say, the encoded image data may also be stored in the HDD 5001, FDC 5014, or the RAM 5003.

An internal bus 5009 plays a role of allowing data/commands exchanges between respective processing units.

Note that several CPUs can be used in the computer 5000 in place of the one CPU 5010 to speed up the execution of the image processing program codes according to the present invention.

Again the previously mentioned processing flow can also be performed by a DSP(Digital Signal Processor), to speed up the calculations in the flow.

Furthermore, the processing flow can also be realized with micro-program codes in place of the machine codes for the CPU.

In addition, several CPUs may also be used to perform the processing flow by dividing the flow into several parts, such as a feedforward processing part and a feedback processing part.

Third Embodiment of the Present Invention

In a third embodiment of the present invention, an example of application of the image encoding method or apparatus thereof detailed above in the first and second embodiments will be described.

The image encoding method and apparatus thereof; according to the present invention, can be applied to an image encoding apparatus such as a Digital VCR(Video Cassette Recorder) and a VDR (Video Disk Recorder).

Figure 12:
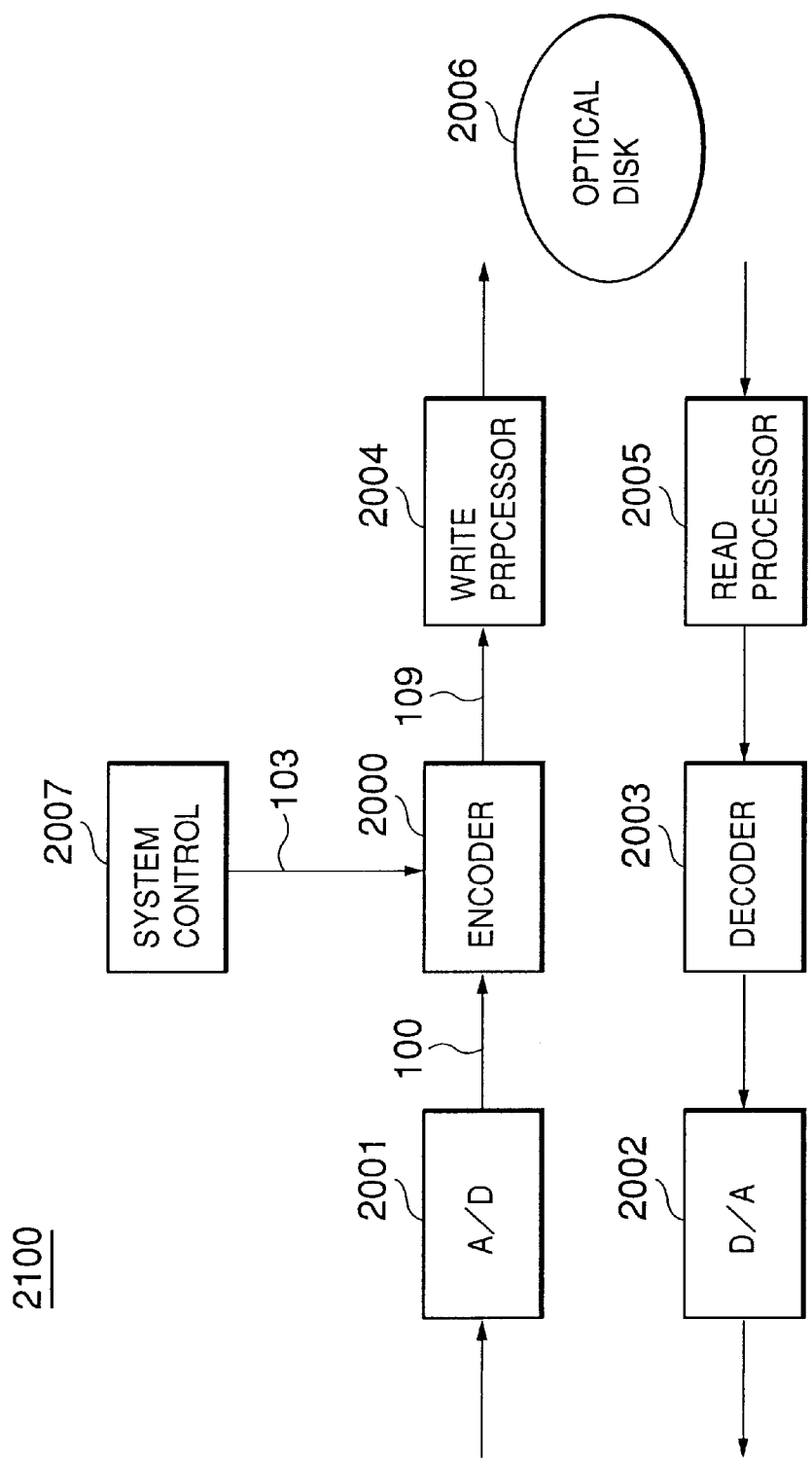
FIG. 12 shows the configuration of an application of the image encoding apparatus.

FIG. 12 shows the configuration of a VDR 2100 in which the image encoding apparatus, according to the present invention, are embedded. An encoder 2000 is realized by the image encoding method and apparatus thereof, according to the present invention. The VDR 2100 is mainly controlled by the VDR system controller 2007 including; a CPU (Central Processing Unit) (not shown). The controller 2007 gives a code amount reference (which is equivalent to those described in previous embodiments) to the encoder 2000 before the encoder starts its operation. Then the encoder 2000 becomes ready to receive image signals 100 from an A/D(Analog to digital) converter 2001 to encode them.

The A/D converter 2001 converts analog image signals to digital image signals 100 (which is equivalent to that in FIG. 1); which encoder 2000 can receive. When the encoder completes reception of them, it starts encoding them with the approaches described in the previous embodiments. It then outputs encoded image data 109 (which is equivalent to the encoded data 109 in FIG. 1) to a write processor 2004. The write processor 2004 generates error correcting codes, attaching them to the encoded data 109. It then generates data packets with a given format to store each piece of the encoded data 109. It then also writes the data packets to an optical disk 2006.

A read processor 2005 plays a role of reading in the stored, encoded data from the optical disk 2006. It then makes an error correction of the read-in encoded data using the error correcting codes attached to the encoded data, and then outputs them to a decoder 2003. The decoder 2003 will then decode the received encoded data from the read processor 2005, outputting them to a D/A(Digital to Analog) converter 2002. The decoding operation of the decoder 2003, or a reverse operation should match that of the encoder 109. Needless to say, those skilled in the art, it is quite easy to design a reverse operation to the encoding operation described in the previous embodiments. The D/A converter makes a reverse-transformation of the decoded data, to the transformation by the A/D converter 2001, and converts them into analog decoded data. It then outputs them to another image recording apparatus or a image display apparatus such as a TV(Television).

The foregoing describes only a small number of embodiments of the present invention, and modifications, (obvious to those skilled in the art), and can be made thereto without departing from the scope of the present invention.

Fifth Embodiment

In a fifth embodiment, a computer program product, such as a FD(Floppy disk) or a magnetic tape cassette, according to the present invention will be provided. The computerprogram product stores computer-readable program codes according to the aforementioned encoding process shown in FIGS. 10A to 10C. The program codes are read in and stored in the RAM 5003 in the computer 5000 shown in FIG. 11. They are then interpreted and executed by the CPU 5010, generating and outputting encoded data.

Figure 15:
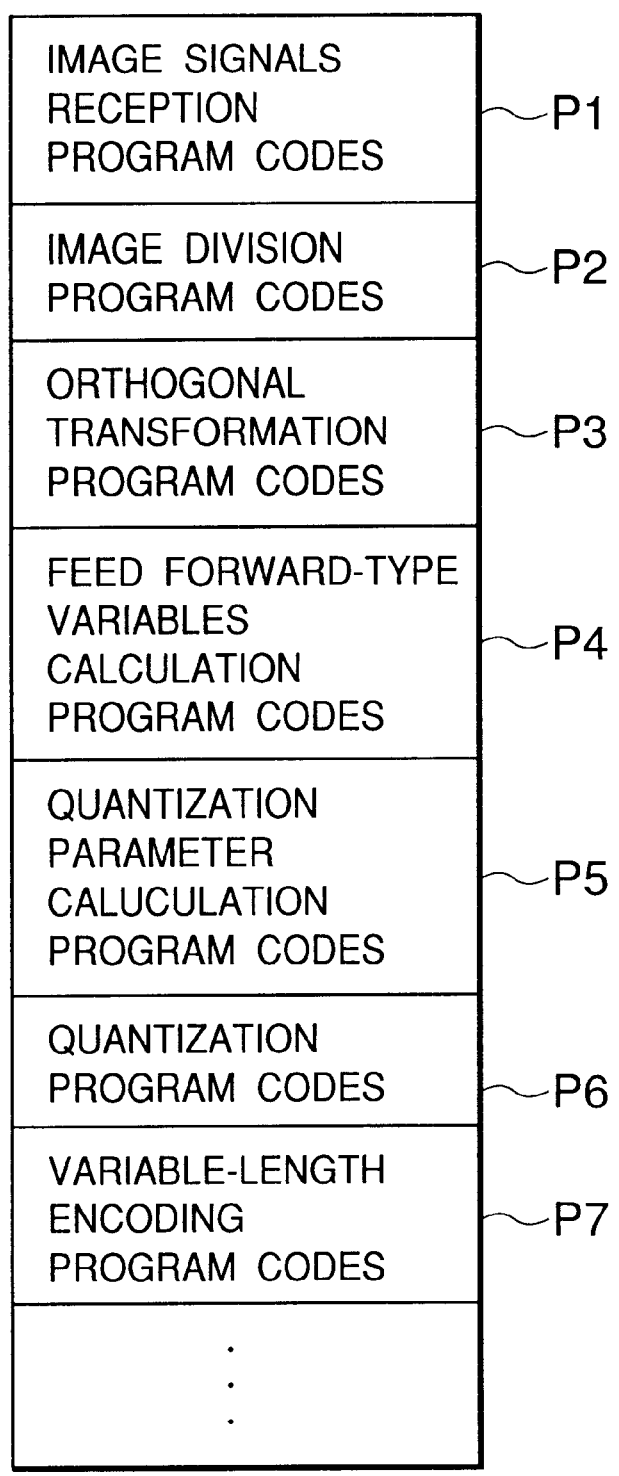
FIG. 15 shows an example memory layout of image encoding program codes according to the present invention.

FIG. 15 shows an example layout of the program codes stored in the computer program product. Image signal reception program codes P1, which image signals to be encoded are received, are of the step S1 in FIG. 10A. Image division program codes P2 which the received image is divided into a plurality of small images, are of the step S2. An orthogonal transformation program codes P3, where each of the small images are orthogonally transformed into transformed coefficients, are of the step S3. Feedforward-type variables calculation program codes P4 are of the steps S4 to S6. The feedforward-type variables stand for those allowed to be calculated without any feedback value resulting from a variable-length encoding process (of the step S19): the MBA, MBQ, SLA, SLQ, FRA and other related connections. Quantization parameter calculation program codes P5 are of the steps S7 to S17, and S20. The parameter includes a quantization step value QS, which will be used to determine a quantization step size for quantizing the transformed coefficients in the step S18. Quantization program codes p7 are of the step S18 quantizing the transformed coefficients in accordance with the parameter. Variable-length encoding program codes P7 are of the step S19 variable-length encoding the quantized coefficients.

Many apparent extremely different memory layouts of the program codes in the present invention can be made by those skilled in the art, without departing from the spirit and scope thereof. It should be understood that the present invention regarding a computer program product is not limited to the specific one described above, except as defined in the appended claims.

Incidentally, as described above in detail, an image encoding apparatus according to the present invention is configured with both a feedforward system (e.g., a group of the macroblock absolute values summation circuit 10, the macroblock quantization step value calculation circuit 14, the frame absolute values summation circuit 12, the frame mean quantization step value calculation circuit 16, the frame mode control circuit, the macroblock mode control circuit 20, and selection circuit 21 in FIG. 2), and a feedback control system (e.g., a group of occurrence code amount prediction circuit 18, the subtracter 19, the selection circuit 22, and the adder 23 in FIG. 2) so that an image can be effectively encoded in a vicinity of a target code amount. It goes without saying that the image can also be effectively encoded by no more than the feedforward system of the present invention.

Note that as many apparently widely different embodiments of the present invention can be made without departing from the spirit and scope thereof, it is to be understood that the invention is not limited to the specific embodiments thereof; except as defined in the appended claims.

What is claimed is:

1. An image encoding apparatus, comprising:
a block partitioning circuit that partitions entered image signals into small blocks, each block including a plurality of pixels;
an orthogonal transformation circuit that performs an orthogonal transformation of each of the small blocks to generate frequency-domain coefficients;
a quantization circuit that quantizes the frequency-domain coefficients;
a code amount control circuit that calculates a quantization step value for each of a succession of macroblocks comprised of a plurality of the small blocks for use by the quantization circuit;
a run-length encoding circuit that performs a variable-length encoding process on the quantized frequency-domain coefficients, and then outputs the encoded coefficients;
the code amount control circuit being comprised of:
a macroblock absolute values summation circuit that calculates a macroblock absolute values sum of frequency domain coefficients for each macroblock;
a macroblock quantization step value calculation circuit that calculates a macroblock quantization value dependent upon the sum of the macroblock absolute values;

a frame absolute values summation circuit that calculates the sum of the absolute values of the frequency-domain coefficients in the entire frame;

a frame mode control circuit that performs a determination of a complexity level of the image, using both the frame absolute values sum and a plurality of predetermined thresholds;

a frame mean-quantization step value calculation circuit that calculates a frame mean quantization step value, controlled by the frame mode control circuit using a plurality of predetermined constants and the frame absolute values sum;

an occurrence code amount prediction circuit that accumulates allocation code amounts for respective macroblocks along a single frame, and also calculates a predictive occurrence code amount accumulated up to one macroblock back;

an error calculating circuit that calculates a differential quantization value step value, using both a code amount cumulative value accumulated up to one macroblock back, the output from the run-length encoding means and the predictive occurrence code amount;

a quantization number control circuit that adaptively controls a number of frequency domain coefficients generated for each of a succession of macroblocks, the number of generated frequency domain coefficient said being quantized by the quantization circuit; and a quantization step value calculation circuit operative to:
compare the macroblock quantization step value, the frame mean-quantization step value, the quantization number and the differential quantization step value with a respective predetermined threshold;
adaptively select either the macroblock quantization step value or the frame mean quantization step value;
add the selected value to the differential quantization step value; and
calculate a quantization step value for use by the quantization circuit.

2. An image encoding apparatus, comprising:

a block partitioning circuit that partitions incoming image signals into small blocks, each made up of a plurality of pixels;

an orthogonal transformation circuit that performs an orthogonal transformation on each of the small blocks to generate frequency domain;

a quantization circuit that quantizes the orthogonally transformed coefficients;

a code amount control circuit that calculates a quantization step value for each of a succession of macroblocks made up of a plurality of blocks, for use by the quantization circuit;

a run-length encoding circuit that performs a variable-length encoding process on the quantized, coefficients, and then outputs the encoded coefficients;

the code amount control circuit being comprised of:
a slice absolute values summation circuit that calculates a slice absolute values sum of frequency-domain coefficients in each image slice with a plurality of macroblocks;

a frame absolute values summation circuit that calculates the sum of the absolute values of frequency-domain coefficients in the entire frame;

a frame mode control circuit that performs a determination of an complexity level of the image, utilizing both the frame absolute values summation and a plurality of predetermined thresholds;

a slice mean-quantization step value calculation circuit that calculates a mean quantization step value for each image slice, controlled by the frame mode control circuit using a plurality of predetermined constants and the slice absolute values sum;

a frame mean quantization step value calculation circuit that calculates a mean quantization step value for each frame, controlled by the frame mode control circuit using a plurality of constants and the frame absolute values sum;

a macroblock allocation code amount calculation circuit that calculates a macroblock allocation code amount for each macroblock in each image slice, using all the frame absolute values sum, the slice absolute values sum, and a code amount reference for a frame;

occurrence code amount prediction circuit that accumulates the macroblock allocation code amount for each macroblock, and calculates a predicted occurrence code length accumulated up to one macroblock back; and an error calculation circuit that calculates a differential quantization step value, using both the code amount cumulative value up to one macroblock back, the output from the run length encoding means and the difference between the predicted code length and the actual code length for the previous macroblock;

a quantization number control circuit that adaptively controls a number of frequency domain coefficients generated for each of a succession of macroblocks, the number of generated frequency domain coefficient said being quantized by the quantization circuit; and a quantization step value calculation circuit operative to:
compare the slice mean quantization step value for each slice, the frame mean quantization step value, the quantization number and the differential quantization step value, with respective predetermined thresholds;
adaptively select either the slice mean quantization step value or the frame mean quantization step value;
add the selected value to the differential quantization step value; and calculating a quantization step value for use in the quantization means.

3. An image encoding apparatus, comprising:

a block partitioning circuit that partitions incoming image signals into small blocks, each made up of a plurality of pixels;

an orthogonal transformation circuit that performs an orthogonal transformation of each of the small blocks to generate frequency-domain coefficients;

a quantization circuit that quantizes the frequency domain coefficients;

a code amount control circuit that calculates a quantization step value for each of a succession of macroblocks including a plurality of small blocks for use by the quantization means;

a run-length encoding circuit that performs a variable-length encoding process on the quantized, coefficients, and then outputs encoded coefficients;

the code amount control circuit being comprised of:
a macroblock absolute values summation circuit that calculates a macroblock absolute values sum of the frequency-domain coefficients for each macroblock;

a slice absolute values summation circuit that calculates the sum of the absolute values of the coefficients for each image slice;

a frame absolute values summation circuit that calculates the sum of the absolute values of the coefficients in the entire frame;

a macroblock quantization step value calculation circuit that calculates a macroblock quantization value, using the macroblock absolute values sum;

a frame mode control circuit that performs a determination of a complexity level of the image, using the frame absolute values sum and a plurality of predetermined thresholds;

a slice mean-quantization-step-value calculation circuit that calculates a mean quantization step value for each image slice, controlled by the frame mode control circuit and using a plurality of predetermined constants and the slice absolute values sum;

a macroblock allocation code amount calculation circuit that calculates a macroblock allocation code amount for each macroblock in each image slice, using the frame absolute values sum, the slice absolute values sum, and a code length reference for a frame;

an occurrence code amount prediction circuit that accumulates allocation code amounts for respective macroblocks in the frame, and calculates a predicted occurrence code amount accumulated up to one macroblock back;

an error calculating circuit that calculates a differential quantization value step value, using the code amount cumulative value for up to one macroblock back the output from the run-length encoding means and the predictive occurrence code amount;

a quantization number control circuit that adaptively controls a number of frequency domain coefficients generated for each of a succession of macroblocks, the number of generated frequency domain coefficient said being quantized by the quantization circuit; and a quantization step value calculation circuit operative to:
compare the macroblock quantization step value, the slice mean quantization step value for each image slice, the frame mean quantization step value, the quantization number and the differential quantization step value, with respective predetermined thresholds, respectively;

adaptively select one of the macroblock quantization step value, the slice mean quantization step value for each image slice, and the frame mean quantization step value; and add the selected value to the differential quantization step value; and calculate a quantization step value for use in the quantization means.

* * * * *